United States Patent
Jin et al.

(10) Patent No.: US 12,150,149 B2
(45) Date of Patent: Nov. 19, 2024

(54) METHOD AND DEVICE FOR SETTING MAXIMUM NUMBER OF MIMO LAYERS FOR EACH BANDWIDTH PART IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 17/625,703

(22) PCT Filed: Jun. 30, 2020

(86) PCT No.: PCT/KR2020/008521
§ 371 (c)(1),
(2) Date: Jan. 7, 2022

(87) PCT Pub. No.: WO2021/006524
PCT Pub. Date: Jan. 14, 2021

(65) Prior Publication Data
US 2022/0287025 A1    Sep. 8, 2022

(30) Foreign Application Priority Data
Jul. 11, 2019    (KR) .......................... 10-2019-0084071

(51) Int. Cl.
*H04W 72/51*    (2023.01)
*H04B 7/0413*    (2017.01)
(Continued)

(52) U.S. Cl.
CPC .......... *H04W 72/51* (2023.01); *H04B 7/0413* (2013.01); *H04W 72/044* (2013.01); *H04W 76/20* (2018.02)

(58) Field of Classification Search
CPC ... H04W 72/51; H04W 72/044; H04W 76/20; H04W 52/02; H04W 52/0209;
(Continued)

(56) References Cited

U.S. PATENT DOCUMENTS

| | | |
|---|---|---|
| 2019/0182000 A1 | 6/2019 | Futaki |
| 2019/0268965 A1 | 8/2019 | Jang et al. |
| 2020/0100178 A1* | 3/2020 | Kim ...................... H04B 7/046 |

OTHER PUBLICATIONS

"3rd Generation Partnership Project; Technical Specification Group Radio Access Network; NR; Multiplexing and channel coding (Release 16)", 3GPP TS 38.212 V16.7.0 (Sep. 2021), 153 pages.
(Continued)

*Primary Examiner* — Dinh Nguyen

(57) ABSTRACT

The present disclosure relates to a communication technique for converging IoT technologies with a 5G communication system for supporting a higher data transfer rate beyond the 4G system, and a system therefor. The present disclosure may be applied to intelligent services (for example, smart homes, smart buildings, smart cities, smart cars or connected cars, health care, digital education, retail businesses, security and safety related services, etc.) on the basis of 5G communication technologies and IoT-related technologies. Further, the present disclosure provides a method and device for setting the maximum number of MIMO layers for each bandwidth part in a next-generation mobile communication system.

12 Claims, 16 Drawing Sheets

(51) Int. Cl.
*H04W 72/044* (2023.01)
*H04W 76/20* (2018.01)

(58) Field of Classification Search
CPC .... H04W 72/20; H04W 72/53; H04B 7/0413; Y02D 30/70
See application file for complete search history.

(56) References Cited

OTHER PUBLICATIONS

"3rd Generation Partnership Project; Technical Specification Group Radio Access Network; NR; Physical layer procedures for data (Release 16)", 3GPP TS 38.214 V16.7.0 (Sep. 2021), 172 pages.
"3rd Generation Partnership Project; Technical Specification Group Radio Access Network; NR; Radio Resource Control (RRC) protocol specification (Release 16)", 3GPP TS 38.331 V16.6.0 (Sep. 2021), 961 pages.
Qualcomm Incorporated, "Potential Techniques for UE Power Saving", 3GPP TSG-RAN WG1 #96, Feb. 25-Mar. 1, 2019, R1-1903016, 33 pages.
CATT, "Power saving scheme with UE adaptation to maximum MIMO layer", 3GPP TSG-RAN WG2 Meeting 105bis, Apr. 8-12, 2019, R2-1903127, 2 pages.
LG Electronics, "Discussions on triggering adaptation of UE power consumption characteristics", 3GPP TSG RAN WG1 Ad-Hoc Meeting 1901, Jan. 21-25, 2019, R1-1900600, 7 pages.
Ericsson, "Discussion on MIMO layers", 3GPP TSG-RAN WG1 Meeting #96bis, Apr. 8-12, 2019, Tdoc R1-1905471, 2 pages.
International Search Report dated Sep. 24, 2020 in connection with International Patent Application No. PCT/KR2020/008521, 2 pages.
Written Opinion of the International Searching Authority dated Sep. 24, 2020 in connection with International Patent Application No. PCT/KR2020/008521, 5 pages.
Office Action dated Aug. 20, 2024, in connection with Korean Application No. 10-2019-0084071, 9 pages.
CATT, "Power saving scheme with UE adaptation to maximum MIMO layer," R1-1906354, 3GPP TSG-RAN WG2 Meeting #97, Reno, USA, May 13-17, 2019, 2 pages.
Mediatek Inc, "On maximum number of MIMO layers," R2-1904422, 3GPP TSG-RAN WG2 #105-bis, Xi'an, China, Apr. 8-12, 2019, 2 pages.

\* cited by examiner

METHOD AND DEVICE FOR SETTING MAXIMUM NUMBER OF MIMO LAYERS FOR EACH BANDWIDTH PART IN NEXT-GENERATION MOBILE COMMUNICATION SYSTEM

CROSS-REFERENCE TO RELATED APPLICATIONS

This application is a 371 of International Application No. PCT/KR2020/008521 filed on Jun. 30, 2020, which claims priority to Korean Patent Application No. 10-2019-0084071 filed on Jul. 11, 2019, the disclosures of which are herein incorporated by reference in their entirety.

BACKGROUND

1. Field

The disclosure relates to a method and apparatus for setting the maximum number of multiple-input-multiple-output (MIMO) layers for each bandwidth part (BWP) in a next generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In addition, research is being conducted on technology for reducing the amount of power consumed by a user equipment (UE) in a 5G communication system.

The disclosure relates to technology for reducing the amount of power consumed by a user equipment (UE) in an NR system, and is to set the maximum number of MIMO layers for each bandwidth part (BWP), which is currently set for each serving cell. That is, in the current NR system, if the number of MIMO layers applied to a predetermined serving cell is set, all BWPs are limited thereto. Although it is desired to apply a low data rate and a small number of MIMO layers in a predetermined BWP, the number of MIMO layers set for each cell needs to be applied as it is. That is, the number of MIMO layers may need to be limited based on a BWP that supports the maximum number of MIMO layers in a cell, or the number of MIMO layers smaller than that of the BWP that supports the maximum number of MIMO layers may be set for the entire cell. In this instance, although a larger number of MIMO layers may be supported in the predetermined BWP, performance may be limited.

SUMMARY

In accordance with an aspect of the disclosure, a method of a user equipment (UE) in a communication system may include, an operation of identifying a downlink bandwidth part (BWP) activated for the UE; an operation of identifying whether information associated with the first maximum number of multi-input-multi-output (MIMO) layers related to the activated downlink bandwidth part is received from a base station; and in case that the information associated with the first maximum number of MIMO layers related to the activated downlink bandwidth part is received, an operation of receiving downlink data based on the first maximum number of MIMO layers, and the information associated with the first maximum number of MIMO layers may be set for each BWP configured for the UE. According to an embodiment, the method of UE of the communication system may further include an operation of receiving information associated with a second maximum number of MIMO layers from the base station; and in case that the information associated with the first maximum number of MIMO layers related to the activated downlink bandwidth part is not received, an operation of receiving downlink data based on the second maximum number of MIMO layers.

According to an embodiment, the information associated with the second maximum number of MIMO layers may be set for each serving cell of the UE.

According to an embodiment, the first maximum number of MIMO layers is less than or equal to the second maximum number of MIMO layers.

According to an embodiment, the information associated with the first number of MIMO layers may be received via a radio resource control (RRC) signaling.

In accordance with an aspect of the disclosure, a method of a base station in a communication system may include, an operation of identifying a downlink bandwidth part (BWP) activated for a UE; an operation of identifying whether information associated with the first maximum number of multi-input-multi-output (MIMO) layers related to the activated downlink bandwidth part is transmitted to the UE; and in case that the information associated with the first maximum number of MIMO layers related to the activated downlink bandwidth part is transmitted, an operation of transmitting downlink data based on the first maximum number of MIMO layers, and the information associated with the first maximum number of MIMO layers is set for each BWP configured for the UE.

In accordance with an aspect of the disclosure, a UE may include, a transceiver; and a controller configured to identify a downlink bandwidth part (BWP) activated for the UE, to identify whether information associated with a first maximum number of multi-input-multi-output (MIMO) layers related to the activated downlink bandwidth part is received from a base station, and to receive downlink data based on the first maximum number of MIMO layers in case that the information associated with the first maximum number of MIMO layers related to the activated downlink bandwidth part is received, and the information associated with the first maximum number of MIMO layers may be set for each BWP configured for the UE.

In accordance with an aspect of the disclosure, a base station of a communication system may include, a transceiver; and a controller configured to identify a downlink bandwidth part (BWP) activated for a UE, to identify whether information associated with the first maximum number of multi-input-multi-output layers related to the activated downlink bandwidth part is transmitted to the UE, and to transmit downlink data based on the first maximum number of MIMO layers in case that the information associated with the first maximum number of MIMO layers related to the activated downlink bandwidth part is transmitted, and the information associated with the first maximum number of MIMO layers may be set for each BWP configured for the UE.

In a next generation mobile communication system, the maximum number of MIMO layers which used to be uniformly applied to a predetermined serving cell can be set for each uplink or downlink BWP, or the limit of the maximum number of MIMNO layers can be set for a predetermined BWP, for example, an initial BWP or a default BWP. Accordingly, the number of MIMO layers smaller than the number of MIMO layers applied to other BWPs may be set for the predetermined BWP. Therefore, a UE is capable of reducing the amount of power consumed for transmission or reception when the UE operates in the predetermined BWP.

DETAILED DESCRIPTION

Hereinafter, the operation principle of the disclosure will be described in detail with reference to the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. That is, the disclosure may be applied to mobile communication systems as a whole and, in particular, to all LTE systems and NR systems.

Figure 1:
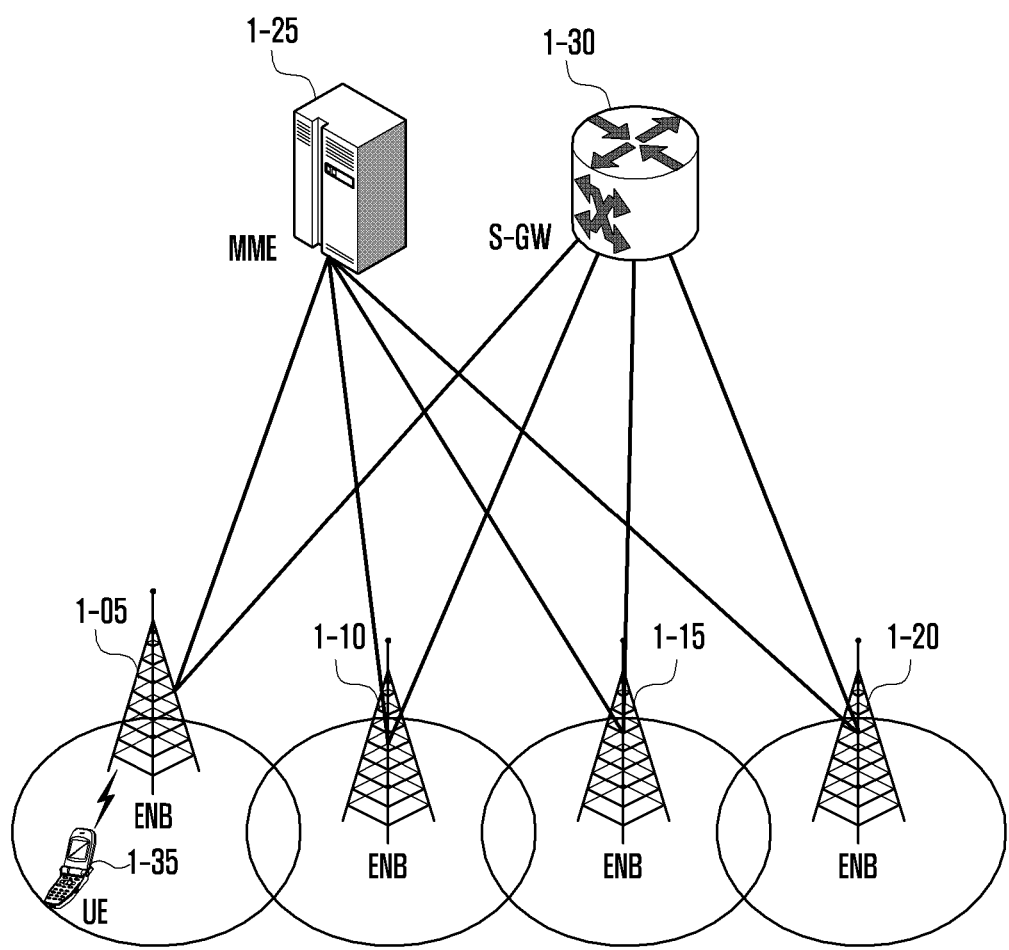
FIG. 1 is a diagram illustrating the structure of an LTE system, which is referred to for description of the disclosure.

FIG. 1 is a diagram illustrating the structure of an LTE system, which is referred to for description of the disclosure.

Referring to FIG. 1, as illustrated in the drawings, a radio access network of an LTE system includes next generation base stations (an evolved Node B (eNB), a Node B, or a base station) 1-05, 1-10, 1-15, and 1-20, a mobility management entity (MME) 1-25, and a serving-gateway (S-GW) 1-30. A user equipment (UE) (or a terminal) 1-35 accesses an external network via the eNB 1-05 to 1-20 and the S-GW 1-30.

In FIG. 1, the eNB 1-05 to 1-20 corresponds to a legacy node B in a UMTS system. The eNB is connected to the UE 1-35 via a wireless channel, and performs a more complicated role than the legacy node B. In the LTE system, real-time services, such as a voice over IP (VoIP) via an Internet protocol, and all user traffic are provided via a shared channel. Accordingly, there is a desire for a device that performs scheduling by collecting state information, such as the buffer state of UEs, an available transmission power state, a channel state, and the like, and the eNB 1-05 to 1-20 may be in charge of it. One eNB generally controls a plurality of cells. For example, in order to implement a transmission rate of 100 Mbps, the LTE system uses an orthogonal frequency division multiplexing (OFDM) as a wireless access technology in a bandwidth of 20 MHz. In addition, an adaptive modulation & coding (AMC) scheme that determines a modulation scheme and a channel coding rate may be applied based on the channel state of a UE. The S-GW 1-30 is a device for providing a data bearer, and produces or removes a data bearer according to the control by the MME 1-25. The MME is a device that is in charge of various control functions in addition to a mobility management function associated with a UE, and may be connected to a plurality of eNB s.

Figure 2:
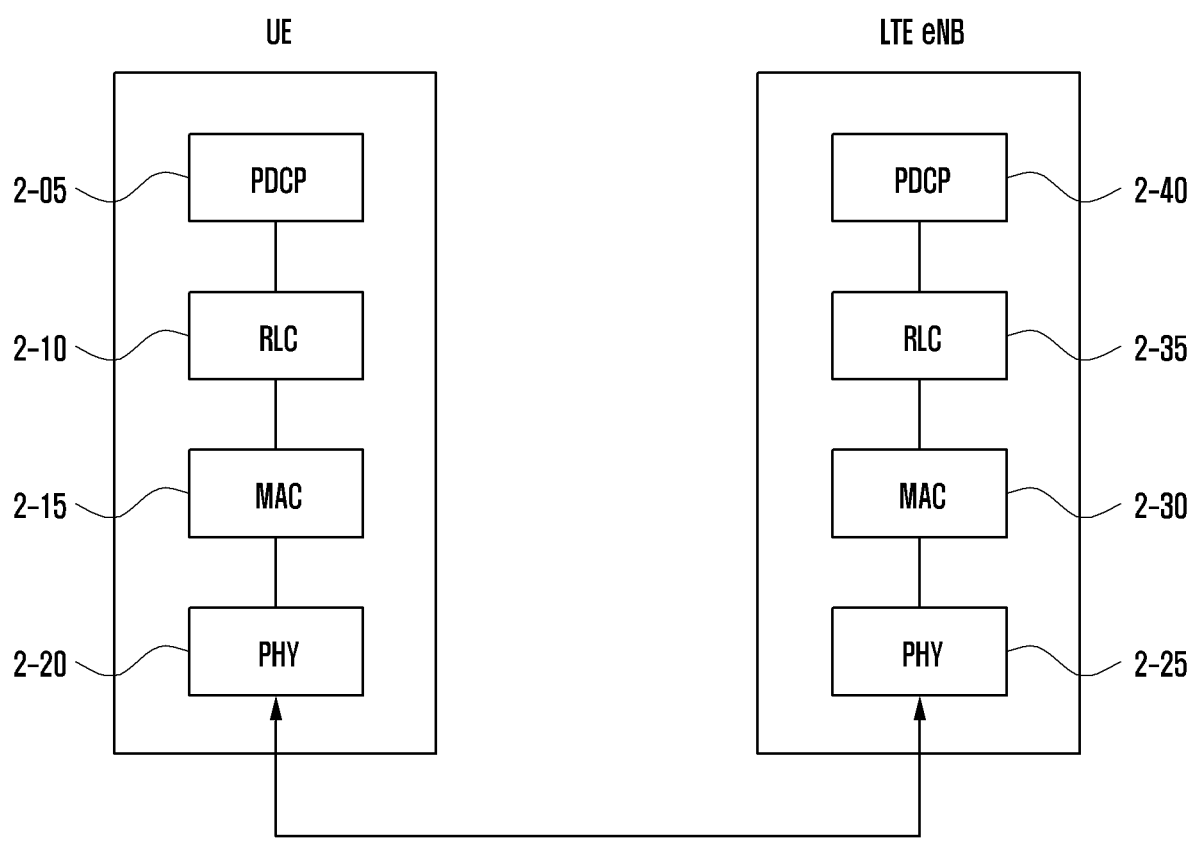
FIG. 2 is a diagram illustrating the structure of a radio protocol in an LTE system, which is referred to for description of the disclosure.

FIG. 2 is a diagram illustrating the structure of a radio protocol in an LTE system, which is referred to for description of the disclosure.

Referring to FIG. 2, the radio protocol of the LTE system may include a packet data convergence protocol (PDCP) 2-05 and 2-40, a radio link control (RLC) 2-10 and 2-35, a medium access control (MAC) 2-15 and 2-30 for each of a UE and an eNB. The PDCP 2-05 and 2-40 is in charge of IP header compression/decompression, or the like. The main functions of the PDCP are summarized as follows.

Header compression and decompression (header compression and decompression: ROHC only)

Transfer of user data

Sequential delivery (in-sequence delivery of upper layer PDUs at PDCP re-establishment procedure for RLC AM)

Reordering (for split bearers in DC (only support for RLC AM): PDCP PDU routing for transmission and PDCP PDU reordering for reception)

Duplicate detection (duplicate detection of lower layer SDUs at PDCP re-establishment procedure for RLC AM)

Retransmission (retransmission of PDCP SDUs at handover and, for split bearers in DC, of PDCP PDUs at PDCP data-recovery procedure, for RLC AM)

Ciphering and deciphering

Timer-based SDU discard (timer-based SDU discard in uplink)

A radio link control (RLC) 2-10 and 2-35 reestablishes a PDCP packet data unit (PDU) in an appropriate size, and performs ARQ or the like. The main functions of the RLC are summarized as follows.

Transfer of data (transfer of upper layer PDUs)

ARQ (error correction through ARQ (only for AM data transfer))

Concatenation, segmentation and reassembly (concatenation, segmentation and reassembly of RLC SDUs (only for UM and AM data transfer))

Re-segmentation (re-segmentation of RLC data PDUs (only for AM data transfer))

Reordering (Reordering of RLC data PDUs (only for UM and AM data transfer)

Duplicate detection (duplicate detection (only for UM and AM data transfer))

Error detection (protocol error detection (only for AM data transfer))

RLC SDU discard (RLC SDU discard (only for UM and AM data transfer))

RLC re-establishment

The MAC 2-15 and 2-30 is connected with various RLC layer devices configured for one UE, and multiplexes RLC PDUs to a MAC PDU and demultiplexes RLC PDUs from a MAC PDU. The main functions of the MAC are summarized as follows.

Mapping (Mapping between logical channels and transport channels)

Multiplexing and demultiplexing (multiplexing/demultiplexing of MAC SDUs belonging to one or different logical channels into/from transport blocks (TB) delivered to/from the physical layer on transport channels)

Scheduling information reporting

HARQ (error correcting through HARQ)

Priority handling between logical channels (priority handling between logical channels of one UE)

Priority handling between UEs (priority handling between UEs by means of dynamic scheduling)

MBMS service identification

Transport format selection

Padding

The PHY layer 2-20 and 2-25 performs an operation of channel-coding and modulating upper layer data to produce an OFDM symbol and transmitting the OFDM symbol via a wireless channel, or demodulating and channel-decoding an OFDM symbol received via a wireless channel and transmitting the demodulated and channel-decoded OFDM symbol to an upper layer.

Figure 3:
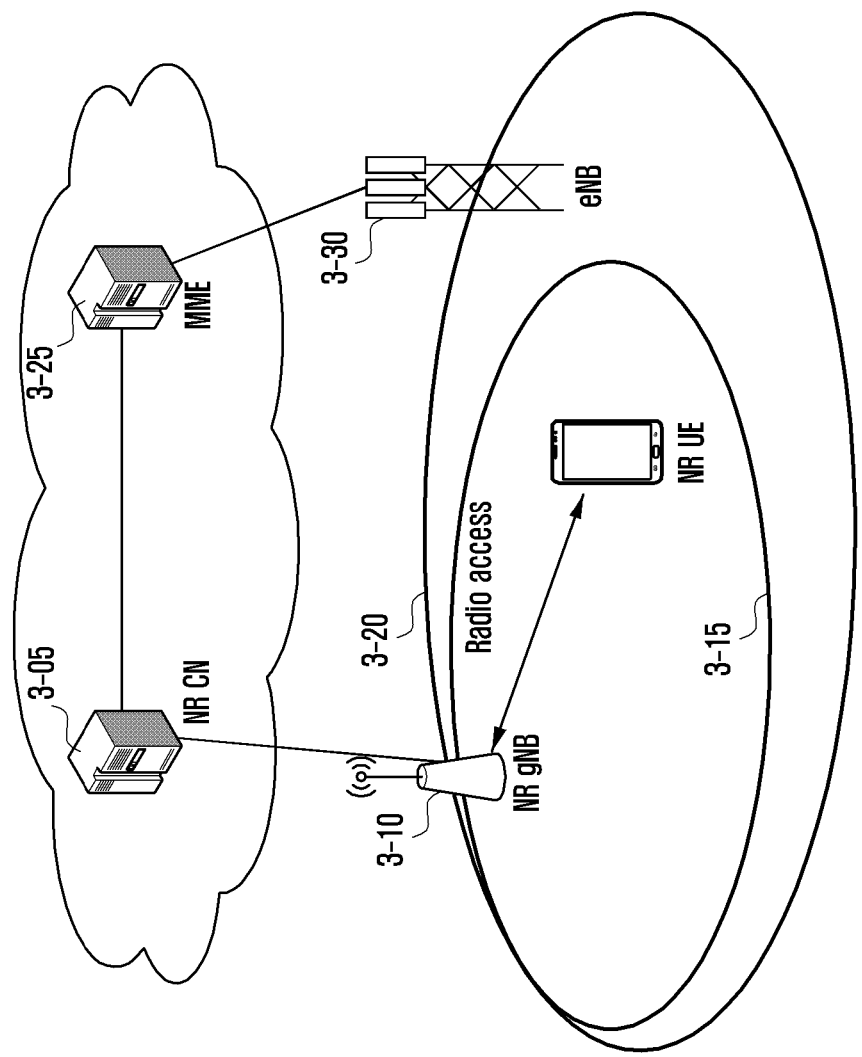
FIG. 3 is a diagram illustrating the structure of a next generation mobile communication system to which the disclosure is applied.

FIG. 3 is a diagram illustrating the structure of a next generation mobile communication system to which the disclosure is applied.

Referring to FIG. 3, a radio access network of a next generation mobile communication system includes a next generation base station (a new radio node B (NR NB) or an NR gNB) 3-10 and a new radio core network (NR CN) 3-05 as illustrated in the drawing. A new radio user equipment (NR UE) (or a UE) 3-15 may access an external network via an NR gNB 3-10 and an NR CN 3-05.

In FIG. 3, the NR gNB 3-10 corresponds to an evolved Node B (eNB) of a legacy LTE system. The NR gNB is connected to the NR UE 3-15 via a wireless channel, and may provide a better service than a service from the legacy Node B. In the next generation mobile communication system, all user traffic are serviced via a shared channel. Accordingly, there is a desire for a device that performs scheduling by collecting state information such as a buffer state, an available transmission power state, a channel condition, and the like in association with UEs. The NR gNB 3-10 takes charge of the same. A single NR gNB generally controls a plurality of cells. In order to implement ultra-high speed data transmission when compared to legacy LTE, a bandwidth greater than or equal to the current maximum bandwidth may be used, and an orthogonal frequency division multiplexing (OFDM) is used as a radio access technology and a beamforming technology is additionally used. In addition, an adaptive modulation & coding (AMC) scheme that determines a modulation scheme and a channel coding rate may be applied based on the channel state of a UE. The NR CN 3-05 performs a function of supporting mobility, configuring a bearer, configuration a QoS, and the like. The NR CN is a device that is in charge of various control functions in addition to a mobility management function associated with a UE, and may be connected to a plurality of base stations. In addition, the next generation mobile communication system may interoperate with a legacy LTE system, and an NR CN is connected to an MME 3-25 via a network interface. The MME is connected to an eNB 3-30 which is a legacy base station.

Figure 4:
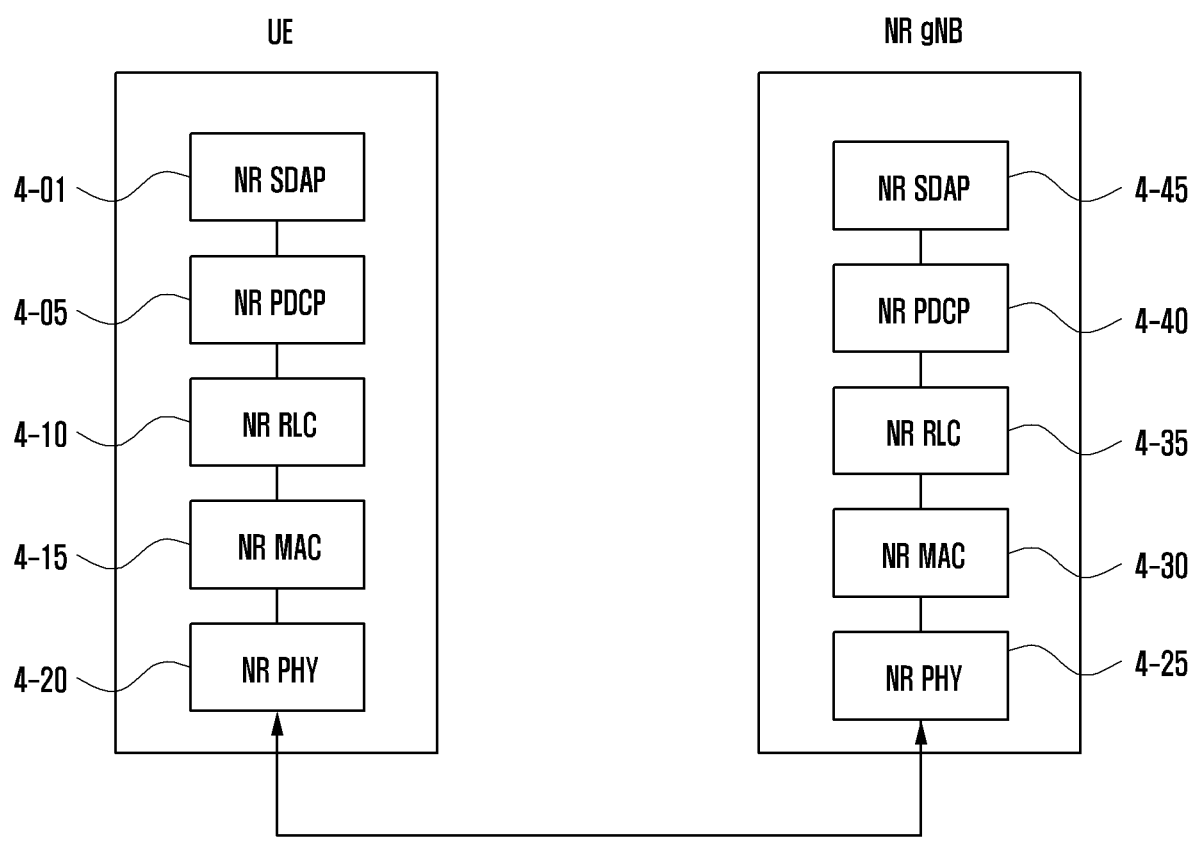
FIG. 4 is a diagram illustrating the structure of a radio protocol of a next generation mobile communication system to which the disclosure is applicable.

FIG. 4 is a diagram illustrating the structure of a radio protocol of a next generation mobile communication system to which the disclosure is applicable.

Referring to FIG. 4, the radio protocol of the next generation mobile communication system may include an NR SDAP 4-01 and 4-45, an NR PDCP 4-05 and 4-40, an NR RLC 4-10 and 4-35, and an NR MAC 4-15 and 4-30 for each of a UE and an NR gNB.

The main functions of the NR SDAP 4-01 and 4-45 may include some of the following functions.
Transfer of user data (transfer or user plane data)
Mapping between a QoS flow and a data bearer for both uplink and downlink (mapping between a QoS flow and a DRB for both DL and UL)
Marking a QoS flow ID for both an uplink and a downlink (marking QoS flow ID in both DL and UL packets)
Mapping reflective QoS flow to data bearer for uplink SDAP PDUs (reflective QoS flow to DRB mapping for the UL SDAP PDUs)

In association with an SDAP layer device, whether to use the header of the SDAP layer device or whether to use the function of the SDAP layer device may be configured for the UE via an RRC message for each PDCP layer device, for each bearer, or for each logical channel. If the SDAP header is configured, a NAS reflective QoS configuration one-bit indicator and an AS reflective QoS configuration one-bit indicator of the SDAP header may provide an indication so that the UE updates or reconfigures mapping information between a QoS flow and a data bearer in an uplink and a downlink. The SDAP header may include QoS flow ID information indicating QoS. The QoS information may be used as data processing priority information, scheduling information, or the like for supporting a smooth service.

The main functions of the NR PDCP 4-05 and 4-40 may include some of the following functions.

Header compression and decompression (header compression and decompression: ROHC only)
Transfer of user data
Sequential transfer (in-sequence delivery of upper layer PDUs)
Not sequential transfer (out-of sequence delivery of upper layer PDUs)
Reordering (PDCP PDU reordering for reception)
Duplicate detection (duplicate detection of lower layer SDUs)
Retransmission (retransmission of PDCP SDUs)
Ciphering and deciphering
Timer-based SDU discard (timer-based SDU discard in uplink)

The reordering function of the NR PDCP device may refer to a function of sequentially reordering PDCP PDUs received from a lower layer according to a PDCP sequence number (SN), and may include a function of transferring sequentially reordered data to an upper layer, a function of immediately transferring data irrespective of a sequence, a function of recording lost PDCP PDUs after sequential recording, a function of reporting the states of lost PDCP PDUs to a transmission side, and a function of requesting retransmission of lost PDCP PDUs.

The main function of the NR RLC 4-10 and 4-35 may include some of the following functions.
Transfer of data (transfer of upper layer PDUs)
Sequential transfer (in-sequence delivery of upper layer PDUs)
Not sequential transfer (out-of sequence delivery of upper layer PDUs)
ARQ (error correcting through ARQ)
Concatenation, segmentation, and reassembly (concatenation, segmentation and reassembly of RLC SDUs)
Re-segmentation (re-segmentation of RLC data PDUs)
Reordering (reordering of RLC data PDUs)
Duplicate detection
Error detection (protocol error detection)
RLC SDU discard
RLC re-establishment The mentioned in-sequence delivery function of the NR RLC device is a function of sequentially transferring RLC SDUs, received from a lower layer, to an upper layer. If a single original RLC SDU is divided into multiple RLC SDUs and the multiple RLC SUDs are received, the in-sequence delivery function may include a function of re-establishing and transferring the same, may include a function of reordering the received RLC PDUs according to an RLC sequence number (SN) or a PDCP sequent number (SN), may include a function of recording lost RLC PDUs after sequential reordering, may include a function of reporting the states of lost RLC PDUs to a transmission side, may include a function of requesting retransmission of lost RLC PDUs, may include a function of sequentially transferring only RLC SDUs before a lost RLC SDU, to an upper layer, if a lost RLC SDU exists, may include a function of sequentially transferring all RLC SDUs, received before a predetermined timer starts, to an upper layer even though a lost RLC SDU exists, if the predetermined timer expires, or may include a function of sequentially transferring all RLC SDUs, received up to the present, to an upper layer even though a lost RLC SDU exists, if a predetermined timer expires. Also, RLC PDUs are processed in order of reception (in order of arrival, irrespective of a serial number or a sequence number), and are transmitted to the PDCP device irrespective of a sequence (out-of sequence delivery). In the case of segments, segments, which are stored in a buffer or which are to be received in the future, are received and reconfigured as a single intact RLC PDU, are processed, and are transmitted to the PDCP device. The NR RLC layer may not include a concatenation function. In addition, the concatenation function may be performed in the NR MAC layer or may be replaced with a multiplexing function in the NR MAC layer.

The out-of-sequence delivery function of the NR RLC device is a function of immediately transferring RLC SDUs, received from a lower layer, to an upper layer irrespective of a sequence. If a single original RLC SDU is divided into multiple RLC SDUs and the multiple RLC SDUs are received, the out-of-sequence delivery function may include a function of re-establishing and transmitting the same, and a function of storing the RLC SN or PDCP SN of received RLC PDUs, and performing sequential ordering, and recording lost RLC PDUs.

The NR MAC 4-15 and 4-30 may be connected to multiple NR RLC layer devices configured for a single UE, and the main functions of the NR MAC may include some of the following functions.

Mapping (Mapping between logical channels and transport channels)

Multiplexing and demultiplexing (multiplexing/demultiplexing of MAC SDUs)

Scheduling information reporting

HARQ (error correcting through HARQ)

Priority handling between logical channels (priority handling between logical channels of one UE)

Priority handling between UEs (priority handling between UEs by means of dynamic scheduling)

MBMS service identification

Transport format selection

Padding

The NR PHY layer 4-20 and 4-25 performs channel-coding and modulating of upper layer data to produce an OFDM symbol and transmits the OFDM symbol via a wireless channel, or performs demodulating and channel-decoding of the OFDM symbol, received via a wireless channel, and transmits the demodulated and channel-decoded OFDM symbol to an upper layer.

Figure 5:
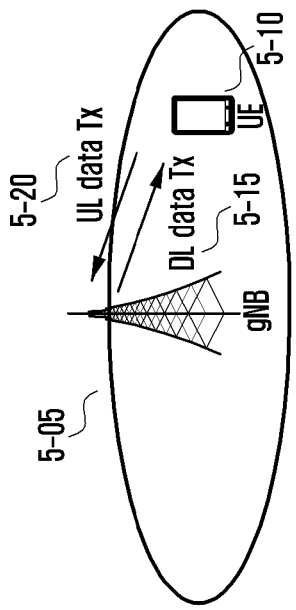
FIG. 5 is a diagram illustrating a system capable of setting the maximum number of MIMO layers for each BWP in an NR system applied to the disclosure.

FIG. 5 is a diagram illustrating a system capable of setting the maximum number of MIMO layers for each BWP in an NR system applied to the disclosure. This is a drawing for the whole scenario applied to the overall disclosure, and describes the main characteristic of the disclosure by showing the difference from the legacy NR system. In addition, technology of applying a bandwidth part (BWP) described in the disclosure is technology in which a single UE performs communication using a partial frequency bandwidth of the system bandwidth used by a single cell. Basically, NR supports a wide range of frequency band (e.g., a bandwidth of 400 MHz) when compared to LTE, and thus, it is difficult to be implemented for a UE that satisfies the corresponding system frequency bandwidth. For some UEs, supporting only a small range of frequency bandwidth may have no problem. The BWP is used for the purpose of reducing the UE manufacturing cost or the amount of power consumed by a UE. The BWP may be configured by a base station only for a UE that supports the BWP (the legacy NR system may configure a total of four BWPs). In the NR system, an additional BWP as shown below may also be defined in the BWP according to a predetermined function and purpose.

|  | Initial BWP | Default BWP | First Active BWP |
| --- | --- | --- | --- |
| BWP index | 0 | indicated by configuration (configurable) | indicated by configuration (configurable) |
| Configuration method | via SIB1 at initial access via RRC reconfiguration message at initial access via RRC reconfiguration message after initial access via RRC reconfiguration message for handover | via RRC reconfiguration message initial BWP is designated as default BWP if default BWP configuration is not present | via RRC reconfiguration message always set |
| Usage and notes | random access according to state transition (from RRC inactive state to RRC connected state) random access for handover random access in connected state normal data transmission in predetermined BWP indicated by RRC configuration | return to default BWP if set bwp-Inactivity Timer value expires | BWP used first after RRC reconfiguration or SCell activation |

For reference, the initial BWP may be configured, irrespective of a total of 4 BWPs which are capable of being configured within a serving cell, or may be configured as one of the BWPs. In addition, a default BWP may be defined for a downlink, and may not be defined for an uplink.

Referring to FIG. 5, a normal NR network system is considered in which an RRC-connected NR UE 5-10 that has the NR gNB 5-05 as a serving cell performs an NR data service. In the disclosure, a first NR system is a legacy NR system, and in the case of the first NR system, the maximum number of MIMO layers is set for each serving cell. That is, in the case of the first NR system, with respect to all UEs that have the NR gNB 5-05 as a serving cell, the gNB 5-05 may set the maximum number of MIMO layers for uplink or downlink data transmission in the corresponding serving cell in common. In other words, a common configuration associated with the maximum number of MIMO layers (the maximum number of layers=8) may be applied to the all downlink BWPs of the serving cell as shown in diagram 5-25. In the same manner, a common configuration associated with the maximum number of MIMO layers (the maximum number of layers=4) may be applied to the all downlink BWPs of the serving cell as shown in diagram 5-30. For reference, the maximum number of MIMO layers of the serving cell set by the gNB may be independently indicated so that the maximum number of MIMO layers for an uplink (UL) and a downlink (DL) are different from each other (or may be set to be the same).

A second NR system provided in the disclosure may set and apply the maximum number of MIMO layers for a predetermined BWP to be different from the maximum number of MIMO layers set for other BWPs, unlike the existing first NR system that sets the maximum number of MIMO layers for each serving cell. From the perspective of the UE, if the maximum number of MIMO layers applied to a predetermined downlink BWP is lower than a value set in advance for each cell, the number of MIMO layers for data reception may be decreased and thus, the UE may reduce the number of MIMO layers needed for monitoring, and may decrease the amount of power for reception. In addition, if the maximum number of MIMO layers for an uplink BWP is lower than a value set in advance for each cell, the number of MIMO layers for data transmission may be decreased and thus, the UE may reduce the number of MIMO layers actually used for transmission, and may decrease the amount of power for transmission. That is, the second NR system provided in the disclosure may adjust the maximum number of MIMO layers for a predetermined BWP, and may reduce the amount of power consumed by the UE. The predetermined BWP may be one of an initial BWP, a default BWP, and a first active BWP, or may be all of them.

Diagram 5-35 is an example of setting the number of MIMO layers for downlink BWP #0 (initial BWP) and BWP #1 (default BWP) which are predetermined BWPs among downlink BWPs configured for the serving cell, to a value which is smaller than the maximum number of MIMO layers set for each serving cell (the maximum number of MIMO layers=4). In the same manner, diagram 5-40 is the case of setting the number of MIMO layers for uplink BWP #0 (initial BWP) which is a predetermined BWP among uplink BWPs configured for the serving cell, to a value which is smaller than the maximum number of MIMO layers set for each serving cell (the maximum number of MIMO layers=2). In the example, it is assumed that a downlink default BWP is set to BWP #1, this is merely an example and does not limit the scope of the disclosure.

Hereinafter, the solution provided in the disclosure will be disclosed by presenting methods of supporting the second NR system defined in FIG. 5, and describing operation performed in an uplink and an uplink for each embodiment. Hereinafter, embodiment 1 considers a method of limiting and setting the maximum number of MIMO layers for a predetermined BWP (an initial BWP, a default BWP, or a first active BWP) among the BWPs configured for a serving cell. Embodiment 1 may consider limiting the number of MIMO layers particularly for the default BWP. From the perspective of the UE, in the case of returning to a default BWP which is a fallback BWP, a scenario that limits the number of MIMO layers than the maximum number of MIMO layers set for other BWPs and supports the basic performance is appropriate. If an initial BWP and a default BWP are the same, the maximum number of MIMO layers for both BWPs may be limited. The main technology proposals in embodiments 1 are summarized as follows.

If an initial BWP and a default BWP are the same, the limitation of the maximum number of MIMO layers is set on both BWPs.

If an initial BWP and a default BWP are different, the limitation of the maximum number of MIMO layers is set on the default BWP.

A method of setting the maximum number of MIMO layers on a first active BWP (optional).

Hereinafter, embodiment 2 provides a solution to flexibly apply the limitation of the maximum number of MIMO layers for each of all the BWPs, which is applicable to any BWP without limiting to a predetermined BWP. This is a scheme of building an architecture in which the maximum number of MIMO layers is capable of being set for all BWPs, and a base station configures the same.

Figure 6:
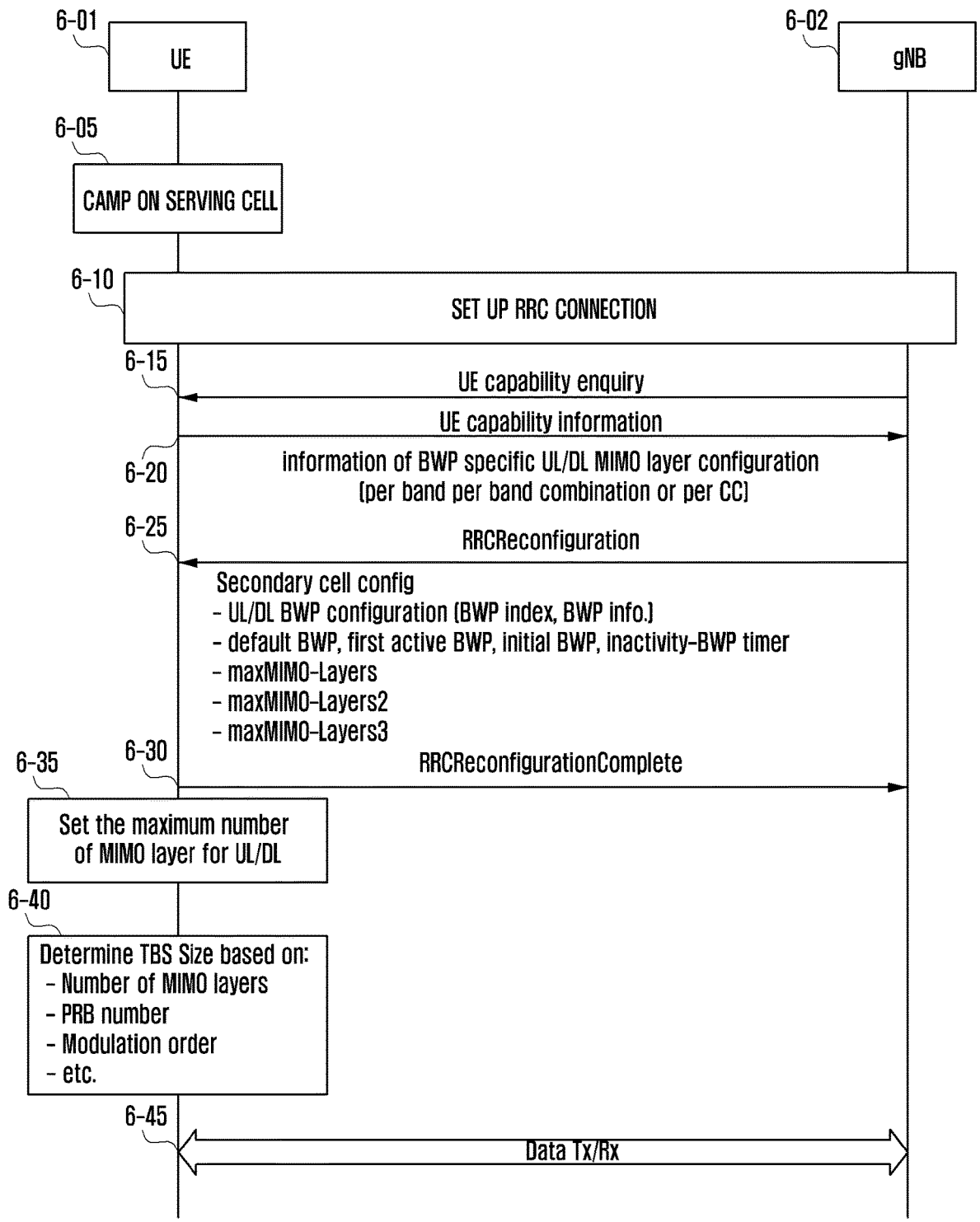
FIG. 6 is a diagram illustrating the overall signal flow applied to embodiment 1 provided in the disclosure.

FIG. 6 is a diagram illustrating the overall signal flow applied to embodiment 1 provided in the disclosure.

As described above, according to embodiment 1, the maximum number of MIMO layers may be limited and set for a predetermined BWP (one of an initial BWP, a default BWP, and a first active BWP, or a combination thereof) among the BWPs configured in a serving cell. In addition, a new parameter (a configuration of the maximum number of MIMO layers for a predetermined BWP) provided in an RRC reconfiguration message may be provided for each serving cell.

Referring to FIG. 6, a UE 6-01 in an RRC IDLE state may camp on a cell 6-02 via a cell selection procedure, and may prepare a service with the corresponding cell in operation 6-05. The camp-on state is the state in which the UE is capable of receiving system information from the corresponding serving cell, setting up a connection via paging, and setting up a connection via UE data generation, and the like. For the reason, the UE may perform an RRC connection procedure with the serving cell in operation 6-10, and is capable of performing data transmission or reception with the corresponding serving cell. A gNB may transmit an RRC message (UECapabilityEnquiry) that requests UE capability to a connected-state UE in operation 6-15, and the UE may transfer a UE capability information (UECapabilityInformation) message to the gNB in response thereto in operation 6-20. The UE capability information RRC message may include overall UE capability, such as a physical area capability, a protocol area capability, frequency band information, and the like supported by the UE. Particularly, the disclosure may further include information indicating whether the maximum number of MIMO layers is capable of being set for each BWP supported by a UE in a second NR system, in addition to the legacy UE capability of a first NR system. The UE capability may be signaled independently for each of an uplink and a downlink, or may be signaled to simultaneously indicate support for an uplink and a downlink. In addition, signaling may be performed according to one of the following methods.

A method of signaling whether to support for each UE (per UE)

A method of signaling whether to support for each b and combination (per band combination)

A method of signaling whether to support for each band in a band combination (per band per band combination)

A method of signaling whether to support for each component carrier (CC) in a corresponding band in a band combination (per CC per band per band combination): including corresponding information in FeatureSetDownlinkPerCC, FeatureSetUPlinkPerCC As the information indicating the UE capability, a 1-bit indicator indicating that the maximum number of MIMO layers indicated for each serving cell may have a different value in a predetermined BWP may be included, or the maximum number of MIMO layers supported by the UE for each BWP, which is different from the maximum number of MIMO layers indicated for each serving cell, may be indicated. In this instance, the corresponding signaling for an uplink and a downlink may be performed independently or in common. For reference, according to the current NR standard, the maximum number of MIMO layers for an uplink and a downlink in a serving cell may be provided for each component carrier (CC) in a corresponding band in a band combination, as shown below. In addition, in detail, in the case of codebook-based transmission, the maximum number of MIMO layers may be independently reported for an uplink (PUSCH). Accordingly, UE capability for the case in which it is different from the codebook-based PUSCH transmission may be additionally included, as opposed to UE capability for overall uplink transmission in a predetermined BWP.

```
FeatureSetDownlinkPerCC ::= SEQUENCE {
supportedSubcarrierSpacingDL SubcarrierSpacing,
supportedBandwidthDL SupportedBandwidth,
channelBW-90mhz ENUMERATED {supported} OPTIONAL,
maxNumberMIMO-LayersPDSCH MIMO-LayersDL OPTIONAL,
supportedModulationOrderDL ModulationOrder OPTIONAL
}
FeatureSetUplinkPerCC ::= SEQUENCE {
supportedSubcarrierSpacingUL SubcarrierSpacing,
supportedBandwidthUL SupportedBandwidth,
channelBW-90mhz ENUMERATED {supported} OPTIONAL,
mimo-CB-PUSCH SEQUENCE {
maxNumberMIMO-LayersCB-PUSCH MIMO-LayersUL OPTIONAL,
maxNumberSRS-ResourcePerSet INTEGER (1..2)
} OPTIONAL,
maxNumberMIMO-LayersNonCB-PUSCH MIMO-LayersUL
OPTIONAL,
supportedModulationOrderUL ModulationOrder OPTIONAL
}
```

The gNB that receives the UE capability information in operation 6-20 may identify whether the corresponding UE is capable of being configured with the maximum number of MIMO layers different for each BWP. If the corresponding gNB supports a configuration of the maximum number of MIMO layers for uplink or downlink data transmission for each BWP, the gNB may set configuration information for the same, may include the configuration information in an RRC reconfiguration message (RRCReconfiguration), and may transmit the same to the UE in operation 6-25. The RRC message may include configuration information associated with a secondary cells, and particularly, may include BWP configuration information for each serving cell, as follows.
  configuration information for each uplink or downlink BWP (pdsch-config, pusch-config)
    BWP index
    BWP detailed configuration information: bandwidth information, a location in the frequency domain, PDSCH and PUSCH configuration information, or the like
    information related to a single BWP per serving cell
    Default BWP index
    First active BWP index
    Initial BWP configuration information (bandwidth information, a location in the frequency domain, or the like)
    Inactivity-BWP timer information (a timer for returning to a default BWP) common configuration information applied to a serving cell
  (signaling separately for an uplink and a downlink: pdsch-ServingCellConfig and pusch-ServingCellConfig)
    The maximum number of MIMO layers applied to the all BWPs of a serving cell
    The maximum number of MIMO layers applied to a predetermined BWP (maxMIMO-Layer2): the corresponding parameter may be applied to a predetermined BWP as below.
    Method 1: applying to all of an initial BWP, a default BWP, and a first active BWP
    Method 2: applying to an initial BWP and a default BWP
    Method 3: applying to only a default BWP
    (optional) in the case in which method 2 or method 3 is applied, the maximum number of MIMO layers applied only to a first active BWP (maxMIMO-Layer3)

The UE that receives the RRC reconfiguration information may transmit an RRCReconfigurationComplete message to the gNB as an acknowledgement message indicating that the corresponding RRC message is received in operation 6-30. If the UE receives configuration information (maxMIMO-Layer2, maxMIMO-Layer3) associated with the maximum number of MIMO layers applied to a predetermined BWP from the gNB in operation 6-25, and if the UE operates in the corresponding BWP according to the configuration information, the UE may set the maximum number of MIMO layers in the corresponding uplink or downlink BWP based on the set parameter in operation 6-35, and may prepare and perform data transmission or reception in operation 6-45. Through the above, the maximum number of MIMO layers applied to a predetermined downlink BWP may become smaller than a value set in advance for each cell. When the number of MIMO layers for data reception is decreased, the UE may reduce the number of reception MIMO layers needed for monitoring, and thus, may reduce the amount of power consumed for reception. If the maximum number of MIMO layers for an uplink BWP becomes lower than a value set in advance for each cell, the number of MIMO layers for data transmission may be decreased and thus, the UE may reduce the number of MIMO layers actually used for transmission, and may decrease the amount of power consumed for transmission. In addition, the predetermined BWP may be one of an initial BWP, a default BWP, and a first active BWP, or may be a combination thereof.

Particularly, newly introduced parameters and the conditions shown below may be added to the standard. That is, a method of applying maxMIMO-Layer differs depending on whether maxMIMO-Layer2 and maxMIMO-Layer3 are configured.

If maxMIMO-Layer2 and maxMIMO-Layer3 are configured: an MIMO layer is configurable for each BWP.

If maxMIMO-Layer2 and maxMIMO-Layer3 are not configured: maxMIMO-Layer is applied to all BWPs in a serving cell Uplink
  maxMIMO-Layers
    Indicates the maximum MIMO layer to be used for PUSCH in all BWPs of this serving cell. (see TS 38.212 [17], clause 5.4.2.1) if maxMIMO-Layers2 or maxMIMO-Layers3 are not configured. Indicates the maximum MIMO layer to be used for PUSCH in all BWPs except default BWP if maxMIMO-Layer2 is configured.
  maxMIMO-Layers2
    Indicates the maximum MIMO layer to be used for PUSCH in default BWP of this serving cell. (see TS 38.212 [17], clause 5.4.2.1).
  maxMIMO-Layers3
    Indicates the maximum MIMO layer to be used for PUSCH in first active BWP of this serving cell. (see TS 38.212 [17], clause 5.4.2.1).
Downlink
  maxMIMO-Layers
    Indicates the maximum MIMO layer to be used for PDSCH in all BWPs of this serving cell. (see TS 38.212 [17], clause 5.4.2.1) if maxMIMO-Layers2 or maxMIMO-Layers3 are not configured. Indicates the maximum MIMO layer to be used for PDSCH in all BWPs except default BWP if maxMIMO-Layer2 is configured.
  maxMIMO-Layers2
    Indicates the maximum MIMO layer to be used for PDSCH in default BWP of this serving cell. (see TS 38.212 [17], clause 5.4.2.1).
  maxMIMO-Layers3
    Indicates the maximum MIMO layer to be used for PDSCH in first active BWP of this serving cell. (see TS 38.212 [17], clause 5.4.2.1).

Particularly, in operation 6-40, the UE may determine a transport block size (TBS) needed for transmission or reception based on the maximum number of MIMO layers for each uplink or downlink BWP determined in operation 6-35, the number of physical resource blocks (PRBs), a modulation order, and the like. That is, a data block size actually applied to transmission or reception may be determined.

Subsequently, in operation 6-45, the UE may perform data transmission or reception based on the value set in the above-described operations. In the case of uplink transmission, data transmission may be performed by applying the parameters determined in the above-described operations. In the case of downlink reception, monitoring and reception may be performed based on the set number of MIMO layers. According to the disclosure, the UE may perform transmission or reception using a smaller number of MIMO layers in a predetermined BWP, and may reduce the amount of power consumed.

FIGS. 7A, 7B, 8A, and 8B are diagrams clearly illustrating the UE operation (downlink operation and uplink operation) in embodiment 1 which has been described with reference to FIG. 6, and the description which has been provided with reference to FIG. 6 may be applied in association with the overall system and signal flow. That is, FIGS. 7A, 7B, 8A, and 8B mainly describe new operation conditions and characteristics of a UE, and the descriptions which have been provided with reference to FIG. 6 may be repeated or omitted. However, it is apparent that the descriptions may be applied as they are although the descriptions are omitted.

Figure 7A:
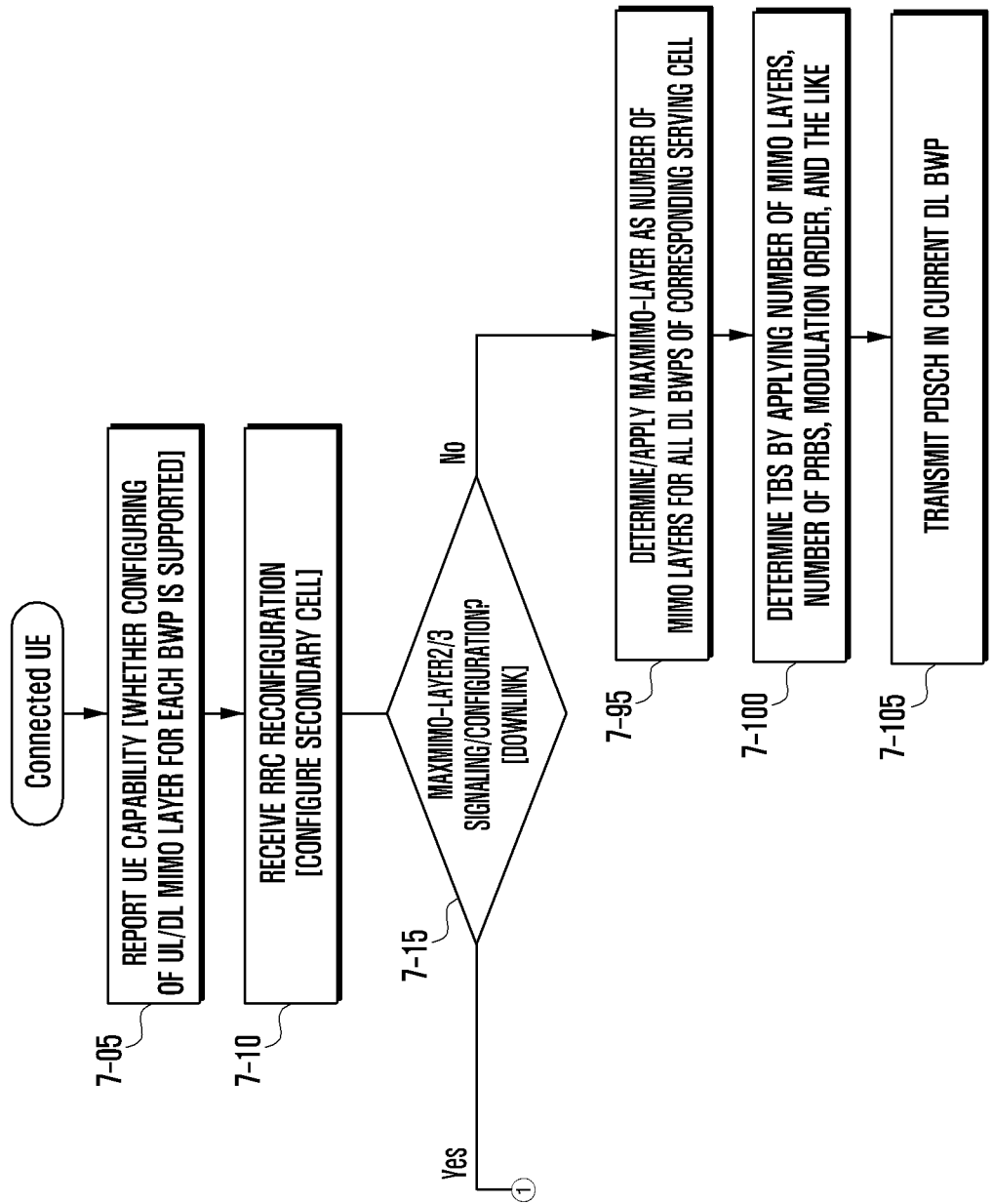
FIG. 7A is a diagram illustrating a part of a method of setting the maximum number of MIMO layers for a predetermined downlink BWP by limiting the number than the cell-based maximum number of MIMO layers in embodiment 1 provided in the disclosure.
Figure 7B:
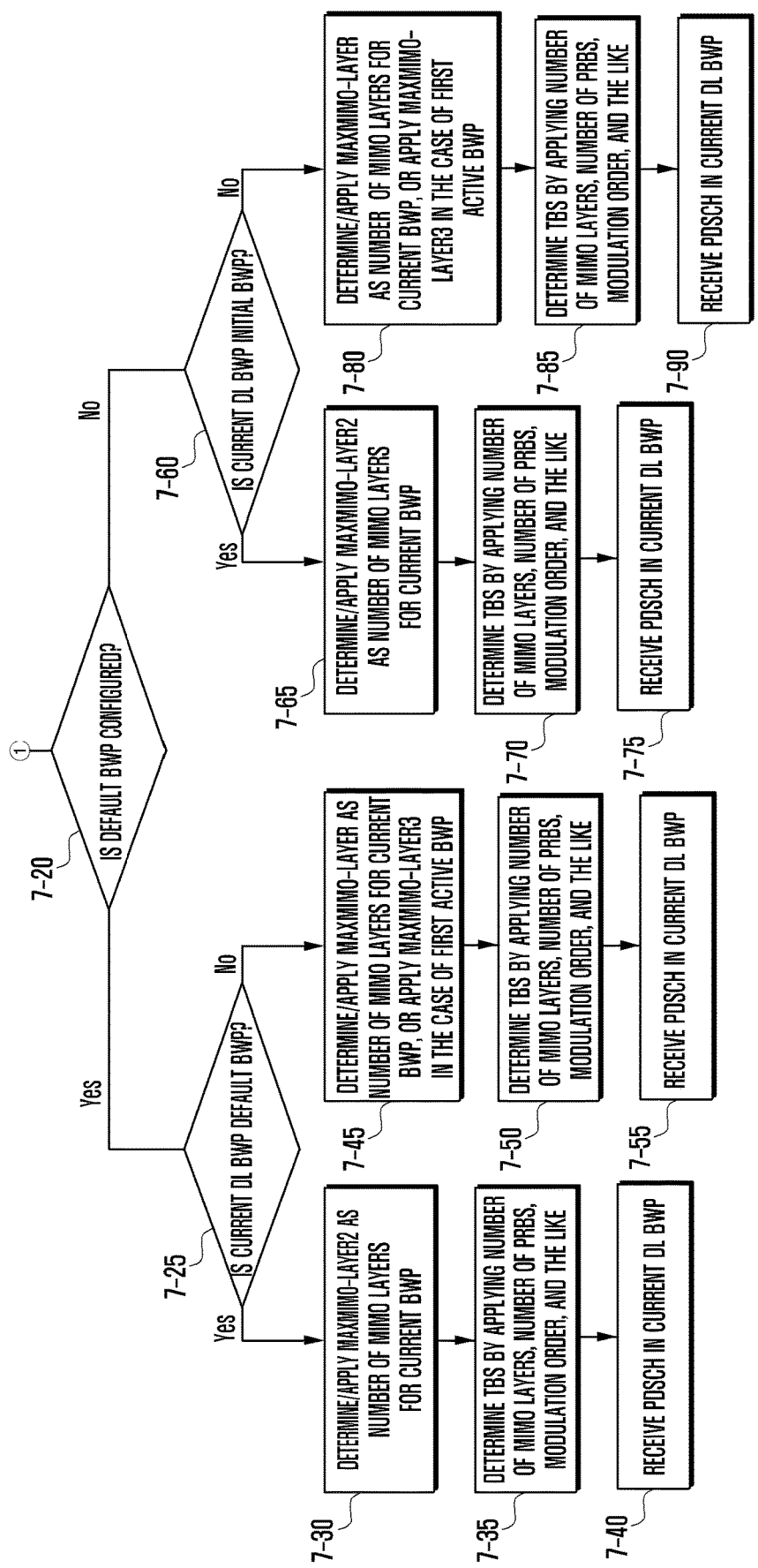
FIG. 7B is a diagram illustrating the remaining part of the method of setting the maximum number of MIMO layers for the predetermined downlink BWP by limiting the number than the cell-based maximum number of MIMO layers in embodiment 1 provided in the disclosure.

FIG. 7A is a diagram illustrating a part of a method of setting the maximum number of MIMO layers for a predetermined downlink BWP by limiting the number than the cell-based maximum number of MIMO layers in embodiment 1 provided in the disclosure, and FIG. 7B is a diagram illustrating the remaining part of the method of setting the maximum number of MIMO layers for the predetermined downlink BWP by limiting the number than the cell-based maximum number of MIMO layers in embodiment 1 provided in the disclosure.

As described above, according to embodiment 1, the maximum number of MIMO layers may be limited and set for a predetermined BWP (one of an initial BWP, a default BWP, and a first active BWP, or a combination thereof) among the BWPs configured in a serving cell. In addition, a new parameter (a configuration of the maximum number of MIMO layers for a predetermined BWP) provided in an RRC reconfiguration message may be provided for each serving cell.

In operation 7-05, an RRC connected state UE may transmit a UE capability information (UECapabilityInformation) message in response to a UE capability request message (UECapabilityEnquriy) from a base station. The UE capability information RRC message may include overall UE capability, such as a physical area capability, a protocol area capability, frequency band information, and the like supported by the UE. Particularly, the disclosure may further include information indicating whether the maximum number of MIMO layers is capable of being set for each BWP supported by a UE in a second NR system, in addition to the legacy UE capability of a first NR system. The UE capability may be signaled independently for each of an uplink and a downlink, or may be signaled to simultaneously indicate support for an uplink and a downlink. In addition, signaling may be performed according to one of the following methods.

A method of signaling whether to support for each UE (per UE).

A method of signaling whether to support for each band combination (per band combination)

A method of signaling whether to support for each band in a band combination (per band per band combination)

A method of signaling whether to support for each component carrier (CC) in a corresponding band in a band combination (per CC per band per band combination): including the corresponding information in FeatureSetDownlinkPerCC, FeatureSetUPlinkPerCC As the information indicating the UE capability, a 1-bit indicator indicating that the maximum number of MIMO layers indicated for each serving cell may have a different value in a predetermined BWP may be included, or the maximum number of MIMO layers supported by the UE for each BWP, which is different from the maximum number of MIMO layers indicated for each serving cell, may be indicated. In this instance, the corresponding signaling for an uplink and a downlink may be performed independently or in common.

The base station that receives the UE capability information in the above operation may identify whether the corresponding UE is capable of being configured with the maximum number of MIMO layers different for each BWP. If the corresponding base station supports a configuration of the maximum number of MIMO layers for uplink or downlink data transmission for each BWP, the base station may set configuration information for the same, and may include the configuration information in an RRC reconfiguration message (RRCReconfiguration). In operation 7-10, the UE may receive the RRC reconfiguration message, and the received RRC message may include configuration information associated with a secondary cells, and particularly, may include BWP configuration information for each serving cell, as follows.

configuration information for each uplink or downlink BWP (pdsch-config, pusch-config)
  BWP index
  BWP detailed configuration information: bandwidth information, a location in the frequency domain, PDSCH and PUSCH configuration information, and the like information related to a single BWP per serving cell
Default BWP index
First active BWP index
Initial BWP configuration information (bandwidth information, a location in the frequency domain, or the like)
Inactivity-BWP timer information (a timer for returning to a default BWP) common configuration information applied to a serving cell (signaling separately for an uplink and a downlink: pdsch-ServingCellConfig and pusch-ServingCellConfig)
The maximum number of MIMO layers applied to the all BWPs of a serving cell
The maximum number of MIMO layers applied to a predetermined BWP (maxMIMO-Layer2): the corresponding parameter may be applied to a predetermined BWP as below.
Method 1: applying to all of an initial BWP, a default BWP, and a first Active BWP
Method 2: applying to an initial BWP and a default BWP
Method 3: applying to only a default BWP
(optional) in the case in which method 2 or method 3 is applied, the maximum number of MIMO layers applied only to a first active BWP (maxMIMO-Layer3)

In operations subsequent to operation 7-15, the UE may perform preparing of downlink data reception by applying the RRC message and parameters received in the above operation. Hereinafter, among operations in embodiment 1, setting of the maximum number of MIMO layers for the UE for downlink data reception and preparing of actual reception of a physical data block will be described, and uplink UE operation will be described with reference to FIG. 8, separately. However, it is apparent that operations subsequent to operation 7-15 in the drawing and operations subsequent to operation 8-15 are simultaneously applied to the UE and are performed.

In operation 7-15, the UE identifies whether a parameter (maxMIMO-Layer2) for setting the maximum number of MIMO layers applied to a predetermined BWP is signaled together with a parameter (maxMIMO-Layer) for setting the maximum number of MIMO layers configured for a downlink for each serving cell (pdsch-ServingCellConfig), via the RRC reconfiguration message received in operation 7-10. In addition, the predetermined BWP to which maxMIMO-Layer2 is applied may be as follows.

Method 1: applying to all of an initial BWP, a default BWP, and a first Active BWP
Method 2: applying to an initial BWP and a default BWP
Method 3: applying to only a default BWP In the drawing, among the above-described methods, method 3 is basically applied, and if a default BWP is the same as an initial BWP, the same configuration may be applied to the initial BWP. In addition, although not illustrated in the drawing, if maxMIMO-Layer2 is applied to method 1 or method 2, a configuration associated with the maximum number of MIMO layers for the corresponding BWP may be applied as it is depending on the indication by maxMIMO-Layer2. In addition, in the drawing that applies method 3 (method 2 is also applicable), it is additionally checked, in operation 7-15, whether a parameter (maxMIMO-Layer3) for setting the maximum number of MIMO layers applicable to a downlink first active BWP in a serving cell is signaled in the RRC reconfiguration message received in operation 7-10. The maxMIMO-Layer3 parameter may be configured independently from maxMIMO-Layer2 parameter. However, in the disclosure, it is assumed that the maxMIMO-Layer3 parameter is optionally configured only under the condition that the maxMIMO-Layer2 parameter is configured.

If the maxMIMO-Layer2 parameter is configured in the downlink configuration information (pdsch-ServingCellConfig) of the serving cell in operation 7-15, the UE may identify whether a default BWP is configured in the corresponding serving cell based on the configuration included in the RRC control message received in operation 7-10, in operation 7-20. If a default BWP configuration is included, the UE may identify whether a downlink BWP in which the UE currently operates is the default BWP in operation 7-25. If the downlink BWP in which the UE currently operates is the default BWP, the UE may set the maximum number of MIMO layers for the default BWP which is the current downlink BWP, to maxMIMO-Layer2 and apply the same in operation 7-30. In operation 7-35, the UE may determine the maximum value of a transport block size (TBS) needed for data reception by applying the set maximum number of MIMO layers, the number of PRBs, a modulation order, and the like. That is, the maximum value of a data block size actually applied to reception may be determined. The UE may need to prepare MIMO layers, of which the number corresponds to the maximum number of MIMO layers determined in the above-described operations for downlink data reception, and may need to prepare a data reception block to have a maximum of TBS. Subsequently, in operation 7-40, the UE may perform downlink data reception based on the value set in the above-described operations. Through the above, reception in the predetermined BWP may be performed using a small number of MIMO layers when compared to the reception in other BWPs in the serving cell, and thus, the amount of power consumed may be reduced.

If the downlink BWP in which the UE currently operates is different from the default BWP in operation 7-25, the UE may set the maximum number of MIMO layers for the current downlink BWP to maxMIMO-Layer, and may apply the same in operation 7-45. If the current downlink BWP is the first active BWP in this operation, the maximum number of MIMO layers is set to maxMIMO-Layer3, and may be applied. In operation 7-50, the UE may determine the maximum value of a transport block size (TBS) needed for data reception by applying the set maximum number of MIMO layers, the number of PRBs, a modulation order, and the like. That is, the maximum value of a data block size actually applied to reception may be determined. Subsequently, in operation 7-55, the UE may perform downlink data reception based on the value set in the above-described operations. Through the above, reception in the predetermined BWP is performed using a small number of MIMO layers when compared to the reception in other BWPs of the serving cell, and thus, the amount of power consumed may be reduced.

If it is identified that a default BWP configuration is not included in operation 7-20, the UE may identify whether a downlink BWP in which the UE currently operates is the initial BWP in operation 7-60. If the downlink BWP in which the UE currently operates is the initial BWP, the UE may set the maximum number of MIMO layers for the initial BWP which is the current downlink BWP, to maxMIMO-Layer2, and may apply the same in operation 7-65. If the default BWP is not configured, the downlink initial BWP is determined as the default BWP. In operation 7-70, the UE may determine the maximum value of a transport block size (TB S) needed for data reception by applying the set maximum number of MIMO layers, the number of PRBs, a modulation order, and the like. That is, the maximum value of a data block size actually applied to reception may be determined. Subsequently, in operation 7-75, the UE may perform downlink data reception based on the value set in the above-described operations. Through the above, reception in the predetermined BWP is performed using a small number of MIMO layers when compared to the reception in other BWPs, and thus, the amount of power consumed may be reduced.

If the downlink BWP in which the UE currently operates is different from the initial BWP in operation 7-60, the UE may set the maximum number of MIMO layers for the current downlink BWP to maxMIMO-Layer, and may apply the same in operation 7-80. If the current downlink BWP is the first active BWP, the maximum number of MIMO layers for the corresponding BWP is set to maxMIMO-Layer3, and may be applied. In operation 7-85, the UE may determine the maximum value of a transport block size (TB S) needed for data reception by applying the set maximum number of MIMO layers, the number of PRBs, a modulation order, and the like. That is, the maximum value of a data block size actually applied to reception may be determined. Subsequently, in operation 7-90, the UE may perform downlink data reception based on the value set in the above-described operations. Through the above, reception in the predetermined BWP is performed using a small number of MIMO layers when compared to the reception in other BWPs of the serving cell, and thus, the amount of power consumed may be reduced.

Referring again to operation 7-15, if the maxMIMO-Layer2 parameter is not configured in downlink configuration information (pdsch-ServingCellConfig) of the serving cell, the maxMIMO-Layer3 parameter is not present either in the disclosure. For reference, maxMIMO-Layer3 may also be configured independently from maxMIMO-Layer2, as described above. In operation 7-95, the UE may set the maximum number of MIMO layers for the current downlink BWP to maxMIMO-Layer, and may apply the same. If the current downlink BWP is the first active BWP, the maximum number of MIMO layers for the corresponding BWP is set to maxMIMO-Layer3, and may be applied. As described above, however, the maxMIMO-Layer3 parameter is not present either in this operation. In operation 7-100, the UE may determine the maximum value of a transport block size (TBS) needed for data reception by applying the set maximum number of MIMO layers, the number of PRBs, a modulation order, and the like. That is, the maximum value of a data block size actually applied to reception may be determined. Subsequently, in operation 7-105, the UE may perform downlink data reception based on the value set in the above-described operations. Through the above, reception in the predetermined BWP is performed using a small number of MIMO layers when compared to the reception in other BWPs of the serving cell, and thus, the amount of power consumed may be reduced.

Figure 8A:
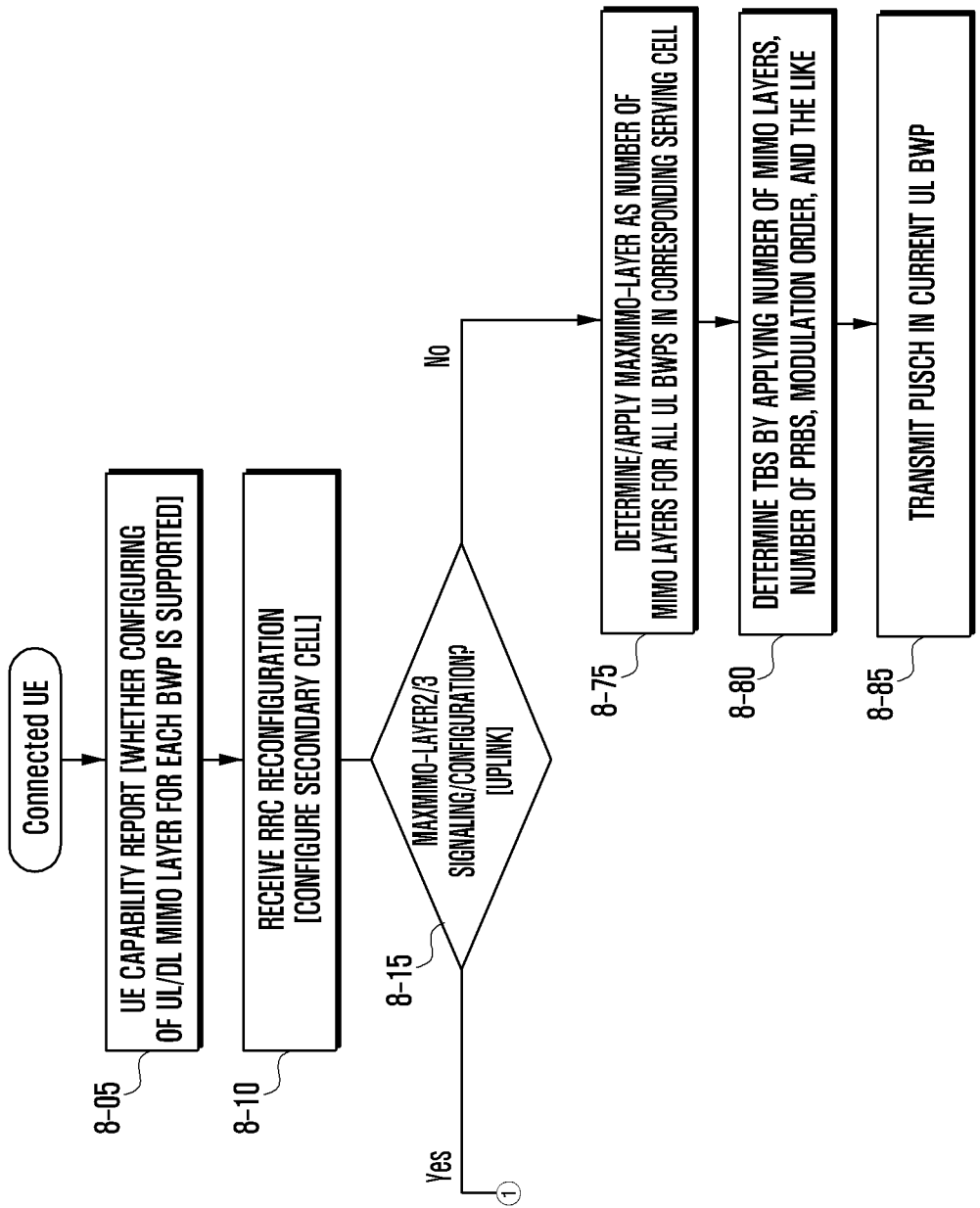
FIG. 8A is a diagram illustrating a part of a method of setting the maximum number of MIMO layers for a predetermined uplink BWP by limiting the number than the cell-based maximum number of MIMO layers in embodiment 1 provided in the disclosure.
Figure 8B:
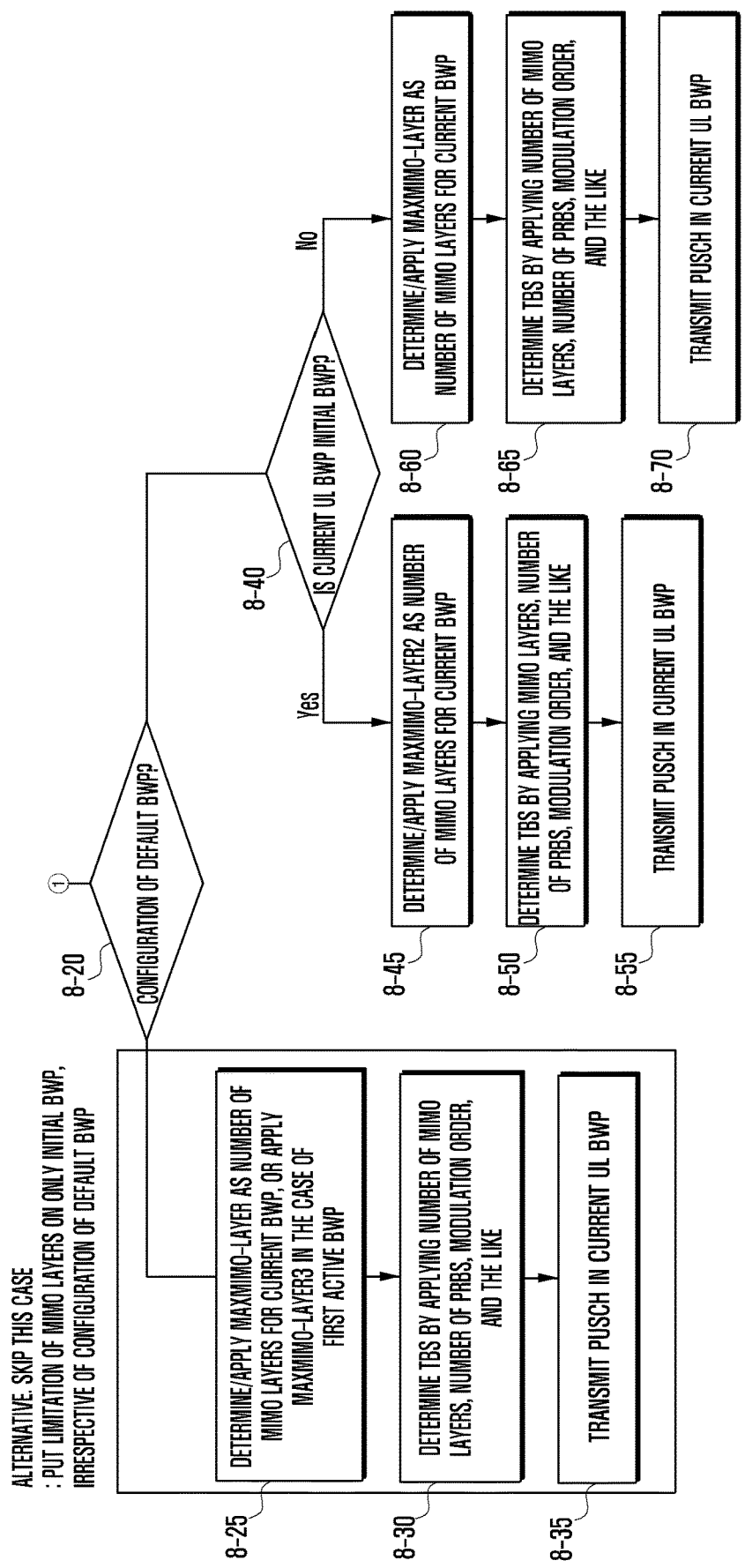
FIG. 8B is a diagram illustrating the remaining part of the method of setting the maximum number of MIMO layers for the predetermined uplink BWP by limiting the number than the cell-based maximum number of MIMO layers in embodiment 1 provided in the disclosure.

FIG. 8A is a diagram illustrating a part of a method of setting the maximum number of MIMO layers for a predetermined uplink BWP by limiting the number than the cell-based maximum number of MIMO layers in embodiment 1 provided in the disclosure, and FIG. 8B is a diagram illustrating the remaining part of the method of setting the maximum number of MIMO layers for the predetermined uplink BWP by limiting the number than the cell-based maximum number of MIMO layers in embodiment 1 provided in the disclosure.

As described above, according to embodiment 1, the maximum number of MIMO layers may be limited and set for a predetermined BWP (one of an initial BWP, a default BWP, and a first active BWP, or a combination thereof) among the BWPs configured in a serving cell. In addition, a new parameter (a configuration of the maximum number of MIMO layers for a predetermined BWP) provided in an RRC reconfiguration message may be provided for each serving cell.

In operation 8-05, an RRC connected state UE may transmit a UE capability information (UECapabilityInformation) message in response to a UE capability request message (UECapabilityEnquriy) from a base station. The UE capability information RRC message may include overall UE capability, such as a physical area capability, a protocol area capability, frequency band information, and the like supported by the UE. Particularly, the disclosure may further include information indicating whether the maximum number of MIMO layers is capable of being set for each BWP supported by a UE in a second NR system, in addition to the legacy UE capability of a first NR system. The UE capability may be signaled independently for each of an uplink and a downlink, or may be signaled to simultaneously indicate support for an uplink and a downlink. In addition, signaling may be performed according to one of the following methods.

A method of signaling whether to support for each UE (per UE)

A method of signaling whether to support for each band combination (per band combination)

A method of signaling whether to support for each band in a band combination (per band per band combination)

A method of signaling whether to support for each component carrier (CC) in a corresponding band in a band combination (per CC per band per band combination): including the corresponding information in FeatureSetDownlinkPerCC, FeatureSetUPlinkPerCC As the information indicating the UE capability, a 1-bit indicator indicating that the maximum number of MIMO layers indicated for each serving cell may have a different value in a predetermined BWP may be included, or the maximum number of MIMO layers supported by the UE for each BWP, which is different from the maximum number of MIMO layers indicated for each serving cell, may be indicated. In this instance, the corresponding signaling for an uplink and a downlink may be performed independently or in common.

The base station that receives the UE capability information in the above operation may identify whether the corresponding UE is capable of being configured with the maximum number of MIMO layers different for each BWP. If the corresponding base station supports a configuration of the maximum number of MIMO layers for uplink or downlink data transmission for each BWP, the base station may set configuration information for the same, and may include the configuration information in an RRC reconfiguration message (RRCReconfiguration). In operation 8-10, the UE may receive the RRC reconfiguration message, and the RRC message may include configuration information associated with a secondary cells, and particularly, may include BWP configuration information for each serving cell, as follows.

configuration information for each uplink or downlink BWP (pdsch-config, pusch-config)

BWP index

BWP detailed configuration information: bandwidth information, a location in the frequency domain, PDSCH and PUSCH configuration information, and the like information related to a single BWP per serving cell Default BWP index First Active BWP index Initial BWP configuration information (bandwidth information, a location in the frequency domain, or the like)

Inactivity-BWP timer information (a timer for returning to a default BWP) common configuration information applied to a serving cell (signaling separately for an uplink and a downlink: pdsch-ServingCellConfig and pusch-ServingCellConfig)

The maximum number of MIMO layers applied to the all BWPs of a serving cell

The maximum number of MIMO layers applied to a predetermined BWP (maxMIMO-Layer2): the corresponding parameter may be applied to a predetermined BWP as below.

Method 1: applying to all of an initial BWP, a default BWP, and a first Active BWP Method 2: applying to an initial BWP and default BWP Method 3: applying only to a default BWP (optional) in the case in which method 2 or method 3 is applied, the maximum number of MIMO layers applied only to a first active BWP (maxMIMO-Layer3)

In operations subsequent to operation 8-15, the UE may perform preparing of uplink data transmission by applying the RRC message and parameters received in the above operation. Hereinafter, among operations in embodiment 1, configuring of the maximum number of MIMO layers for the UE for uplink data transmission and preparing of actual transmission of a physical data block will be described, and downlink UE operation is described with reference to FIG. 7, separately. However, it is apparent that operations subsequent to operation 8-15 in the drawing and the operations subsequent to operation 7-15 are simultaneously applied to the UE and are performed.

In operation 8-15, the UE identifies whether a parameter (maxMIMO-Layer2) for setting the maximum number of MIMO layers applied to a predetermined BWP is signaled together with a parameter (maxMIMO-Layer) for setting the maximum number of MIMO layers configured for a downlink for each serving cell (pdsch-ServingCellConfig) via the RRC reconfiguration message received in operation 8-10. In addition, the predetermined BWP to which maxMIMO-Layer2 is applied may be as follows.

Method 1: applying to all of an initial BWP, a default BWP, and a first active BWP
Method 2: applying to an initial BWP and a default BWP
Method 3: applying only to a default BWP In the drawing, among the above-described methods, method 3 is basically applied, and if a default BWP is the same as a downlink initial BWP, the same configuration may be applied to an uplink initial BWP as well as the downlink initial BWP. In addition, although not illustrated in the drawing, if maxMIMO-Layer2 is applied to method 1 or method 2, a configuration associated with the maximum number of MIMO layers for the corresponding BWP may be applied as it is depending on the indication by maxMIMO-Layer2. In addition, in the drawing in which method 3 is applied (method 2 is also applicable), it is additionally checked, in operation 8-15, whether a parameter for setting the maximum number of MIMO layers (maxMIMO-Layer3) applicable to an uplink first active BWP in a serving cell is signaled in the RRC reconfiguration message received in operation 8-10. The maxMIMO-Layer3 parameter may be configured independently from maxMIMO-Layer2 parameter. However, in the disclosure, it is assumed that the maxMIMO-Layer3 parameter is optionally configured only under the condition that the maxMIMO-Layer2 parameter is configured.

If the maxMIMO-Layer2 parameter is configured in the uplink configuration information (pusch-ServingCellConfig) of the serving cell in operation 8-15, the UE may identify whether a default BWP is configured in the corresponding serving cell based on the configuration included in the RRC control message received in operation 8-10, in operation 8-20. If a default BWP configuration is included, the UE may always apply the maximum number of MIMO layers applied to the entire serving cell, to an uplink BWP in which the UE currently operates, in operation 8-25. The default BWP is configured only for a downlink and the corresponding concept does not exist for an uplink, and since it means that a base station configures maxMIMO-Layer2 only for a default BWP, optimization is not applied to other uplink BWPs. In operation 8-25, the UE may set the maximum number of MIMO layers for the current uplink BWP to maxMIMO-Layer, and may apply the same. In operation 8-30, the UE may determine the maximum value of a transport block size (TBS) needed for uplink data transmission by applying the set maximum number of MIMO layers, the number of PRBs, a modulation order, and the like. That is, the maximum value of a data block size actually applied to data transmission may be determined. The UE may need to prepare MIMO layers, of which the number corresponds to the maximum number of MIMO layers determined in the above-described operations for uplink data transmission, and may need to prepare a data transmission block to have a maximum of TBS. Subsequently, in operation 8-35, the UE may perform uplink data transmission based on the value set in the above-described operations. Through the above, data transmission in the predetermined BWP is performed using a small number of MIMO layers when compared to data transmission in other BWPs, and thus, the amount of power consumed may be reduced. However, if the number of MIMO layers is always limited only for the initial BWP, irrespective of configuration of a default BWP, operations 8-25, 8-30, and 8-35 are not performed, and operations subsequent thereto may be performed.

If it is identified that a default BWP configuration is not included in operation 8-20, the UE may identify whether an uplink BWP in which the UE currently operates is the initial BWP in operation 8-40. If the uplink BWP in which the UE currently operates is the initial BWP, the UE may set the maximum number of MIMO layers for the initial BWP which is the current uplink BWP, to maxMIMO-Layer2, and may apply the same in operation 8-45. If a default BWP is not configured, the downlink initial BWP is determined as the default BWP, and the rules applied to the default BWP may be applied to the uplink initial BWP. That is, a default BWP is not present for an uplink and thus, if the default BWP is the same as the downlink initial BWP, embodiment 1 may apply the rules applied to the default BWP to the downlink initial BWP, and may apply the corresponding rules to the uplink initial BWP corresponding thereto. In operation 8-50, the UE may determine the maximum value of a transport block size (TBS) needed for data transmission by applying the set maximum number of MIMO layers, the number of PRBs, a modulation order, and the like. That is, the maximum value of a data block size actually applied to reception may be determined. Subsequently, in operation 8-55, the UE may perform uplink data transmission based on the value set in the above-described operations. Through the above, reception in the predetermined BWP is performed using a small number of MIMO layers when compared to the reception in other BWPs, and thus, the amount of power consumed may be reduced.

If the uplink BWP in which the UE currently operates is different from the initial BWP in operation 8-40, the UE may set the maximum number of MIMO layers for the current uplink BWP to maxMIMO-Layer, and may apply the same in operation 8-60. If the current uplink BWP is the first active BWP, the maximum number of MIMO layers for the corresponding BWP is set to maxMIMO-Layer3, and may be applied. In operation 8-65, the UE may determine the maximum value of a transport block size (TB S) needed for data transmission by applying the set maximum number of MIMO layers, the number of PRBs, a modulation order, and the like. That is, the maximum value of a data block size actually applied to data transmission may be determined. Subsequently, in operation 8-70, the UE may perform uplink data transmission based on the value set in the above-described operations. Through the above, data transmission in the predetermined BWP is performed using a small number of MIMO layers when compared to data transmission in other BWPs, and thus, the amount of power consumed may be reduced.

Referring again to operation 8-15, if the maxMIMO-Layer2 parameter is not configured in uplink configuration information (pusch-ServingCellConfig) of the serving cell, the maxMIMO-Layer3 parameter is not present either in the disclosure. For reference, maxMIMO-Layer3 may also be configured independently from maxMIMO-Layer2, as described above. In operation 8-75, the UE may set the maximum number of MIMO layers for the current uplink BWP to maxMIMO-Layer, and may apply the same. If the current uplink BWP is the first active BWP, the maximum number of MIMO layers for the corresponding BWP is set to maxMIMO-Layer3, and may be applied. As described above, however, the maxMIMO-Layer3 parameter is not present either in this operation. In operation 8-80, the UE may determine the maximum value of a transport block size (TBS) needed for data transmission by applying the set maximum number of MIMO layers, the number of PRBs, a modulation order, and the like. That is, the maximum value of a data block size actually applied to data transmission may be determined. Subsequently, in operation 8-85, the UE may perform uplink data transmission based on the value set in the above-described operations. Through the above, data transmission in the predetermined BWP is performed using a small number of MIMO layers when compared to data transmission in other BWPs, and thus, the amount of power consumed may be reduced.

Figure 9:
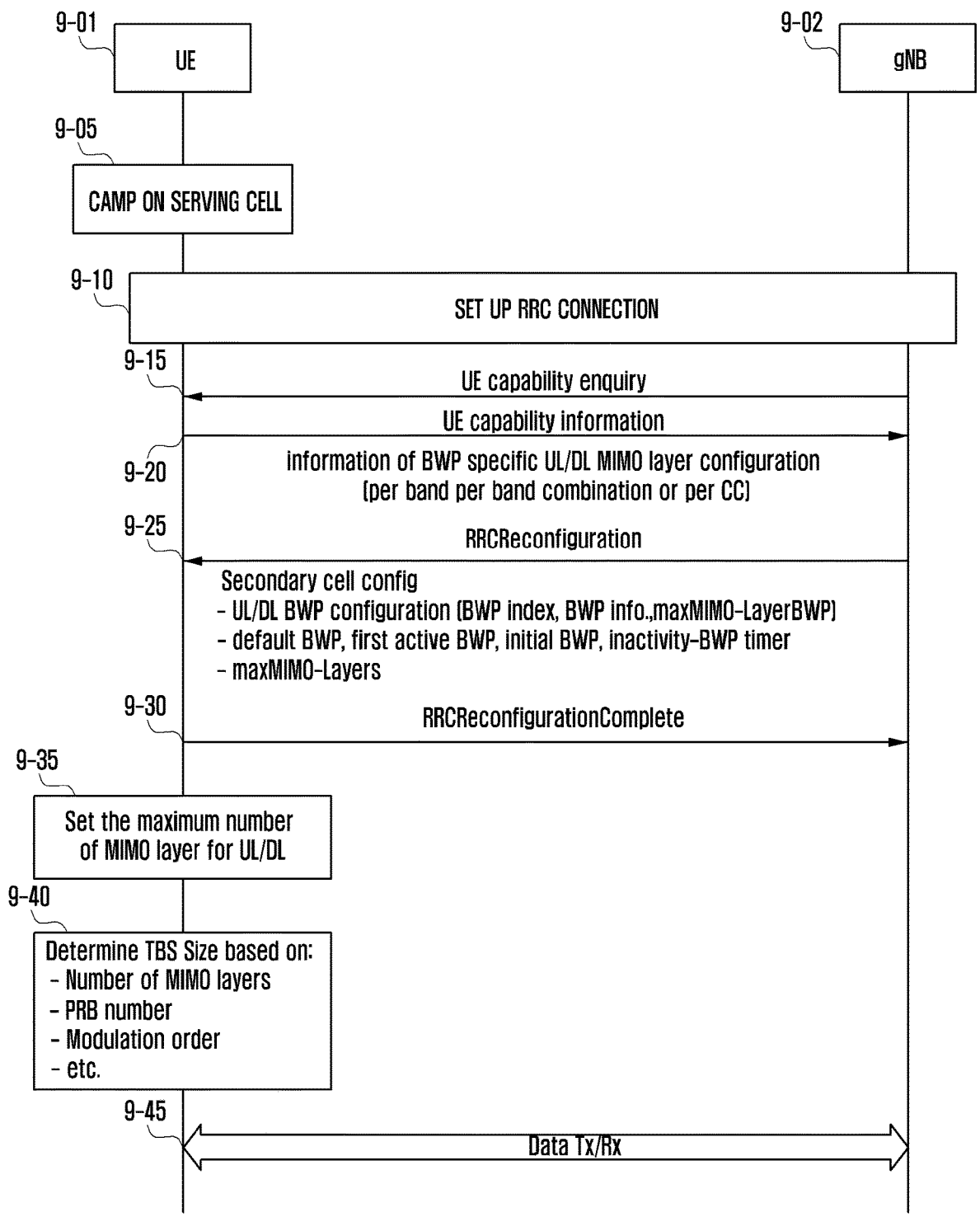
FIG. 9 is a diagram illustrating the overall signal flow applied to embodiment 2 provided in the disclosure.

FIG. 9 is a diagram illustrating the overall signal flow applied to embodiment 2 provided in the disclosure.

As described above, according to embodiment 2, the maximum number of MIMO layers may be limited and set for a BWP among the BWPs configured for a serving cell. From the perspective that all BWPs in the serving cell are capable of having different configurations (the maximum number of MIMO layers) from other BWPs, the configuration of the maximum number of MIMO layers for each BWP may be flexibly applied.

Referring to FIG. 9, a UE 9-01 in an RRC IDLE state may camp on a cell 9-02 via a cell selection procedure, and may prepare a service with the corresponding cell in operation 9-05. The camp-on state is the state in which the UE is capable of receiving system information from the corresponding serving cell, setting up a connection via paging, and setting up a connection via UE data generation, and the like. For the reason, the UE may perform an RRC connection procedure with the serving cell in operation 9-10, and is capable of performing data transmission or reception with the corresponding serving cell. A gNB may transmit an RRC message (UECapabilityEnquiry) that requests UE capability to a connected-state UE in operation 9-15, and the UE may transfer a UE capability information (UECapabilityInformation) message to the gNB in response thereto in operation 9-20. The UE capability information RRC message may include overall UE capability, such as a physical area capability, a protocol area capability, frequency band information, and the like supported by the UE. Particularly, the disclosure may additionally include information indicating whether the maximum number of MIMO layers is capable of being set for each BWP supported by a UE in a second NR system, in addition to the legacy UE capability in a first NR system. The UE capability may be signaled independently for each of an uplink and a downlink, or may be signaled to simultaneously indicate support for an uplink and a downlink. In addition, signaling may be performed according to one of the following methods.

A method of signaling whether to support for each UE (per UE)

A method of signaling whether to support for each band combination (per band combination)

A method of signaling whether to support for each band in a band combination (per band per band combination)

A method of signaling whether to support for each component carrier (CC) in a corresponding band in a band combination (per CC per band per band combination): including the corresponding information in FeatureSetDownlinkPerCC, FeatureSetUPlinkPerCC As the information indicating the UE capability, a 1-bit indicator indicating that the maximum number of MIMO layers indicated for each serving cell may have a different value in a predetermined BWP may be included, or the maximum number of MIMO layers supported by the UE for each BWP, which is different from the maximum number of MIMO layers indicated for each serving cell, may be indicated. In this instance, the corresponding signaling for an uplink and a downlink may be performed independently or in common. For reference, according to the current NR standard, the maximum number of MIMO layers for an uplink and a downlink in a serving cell may be provided for each component carrier (CC) in a corresponding band in a band combination, as shown below. In addition, in detail, in the case of codebook-based transmission, the maximum number of MIMO layers may be independently reported for an uplink (PUSCH). Accordingly, UE capability for the case in which it is different from the codebook-based PUSCH transmission may be additionally included, as opposed to UE capability for overall uplink transmission in a predetermined BWP.

```
FeatureSetDownlinkPerCC ::= SEQUENCE {
supported SubcarrierSpacingDL SubcarrierSpacing,
supportedBandwidthDL SupportedBandwidth,
channelBW-90mhz ENUMERATED {supported} OPTIONAL,
maxNumberMIMO-LayersPDSCH MIMO-LayersDL OPTIONAL,
supportedModulationOrderDL ModulationOrder OPTIONAL
}
FeatureSetUplinkPerCC ::= SEQUENCE {
supported SubcarrierSpacingUL SubcarrierSpacing,
supportedBandwidthUL SupportedBandwidth,
channelBW-90mhz ENUMERATED {supported} OPTIONAL,
mimo-CB-PUSCH SEQUENCE {
maxNumberMIMO-LayersCB-PUSCH MIMO-LayersUL OPTIONAL,
maxNumberSRS-ResourcePerSet INTEGER (1..2)
} OPTIONAL,
maxNumberMIMO-LayersNonCB-PUSCH MIMO-LayersUL OPTIONAL,
supportedModulationOrderUL ModulationOrder OPTIONAL
}
```

The gNB that receives the UE capability information in operation 9-20 may identify whether the corresponding UE is capable of being configured with the maximum number of MIMO layers different for each BWP. If the corresponding gNB supports a configuration of the maximum number of MIMO layers for uplink or downlink data transmission for each BWP, the gNB may include configuration information for the same in an RRC reconfiguration message (RRCReconfiguration), and may transmit the same to the UE in operation 9-25. The RRC message may include configuration information associated with a secondary cells, and particularly, may include BWP configuration information for each serving cell, as follows.

configuration information for each uplink or downlink BWP (pdsch-config, pusch-config)
BWP index
BWP detailed configuration information: bandwidth information, a location in the frequency domain, PDSCH and PUSCH configuration information, and the like
maxMIMO-LayersBWP (first maxMIMO parameter) information related to a single BWP per serving cell
Default BWP index
First Active BWP index Initial BWP configuration information (bandwidth information, a location in the frequency domain, or the like)

Inactivity-BWP timer information (a timer for returning to a default BWP) common configuration information applied to a serving cell (signaling separately for an uplink and a downlink: pdsch-ServingCellConfig and pusch-ServingCellConfig)

The maximum number of MIMO layers applied to the all BWPs of a serving cell (maxMIMO-Layer: second MIMO parameter)

The UE that receives the RRC reconfiguration information may transmit an RRCReconfigurationComplete message to the gNB as an acknowledgement message indicating that the corresponding RRC message is received in operation 9-30. If the UE receives configuration information (maxMIMO-LayerBWP) associated with the maximum number of MIMO layers applied to a BWP from the gNB in operation 9-25, and if the UE operates in the corresponding BWP according to the configuration information, the UE may set the maximum number of MIMO layers in the corresponding uplink or downlink BWP based on the set parameter in operation 9-35, and may prepare and perform data transmission or reception in operation 9-40. Through the above, the maximum number of MIMO layers applied to a downlink BWP may become smaller than a value set in advance for each cell. When the number of MIMO layers for data reception is decreased, the UE may reduce the number of reception MIMO layers needed for monitoring, and thus, may reduce the amount of power consumed for reception. If the maximum number of MIMO layers for an uplink BWP becomes lower than a value set in advance for each cell, the number of MIMO layers for data transmission may be decreased and thus, the UE may reduce the number of MIMO layers actually used for transmission, and may decrease the amount of power consumed for transmission.

In the standard, newly introduced parameters and the conditions shown below may be added.

Uplink
  maxMIMO-Layers
    Indicates the maximum MIMO layer to be used for PUSCH in BWPs of this serving cell. (see TS 38.212 [17], clause 5.4.2.1) for which maxMIMO-LayersBWP is not configured.
  maxMIMO-LayersBWP
    Indicates the maximum MIMO layer to be used for PUSCH in the BWP of this serving cell. (see TS 38.212 [17], clause 5.4.2.1). If absent, maxMIMO-Layers of the serving cell is applied.

Downlink
  maxMIMO-Layers
    Indicates the maximum MIMO layer to be used for PDSCH in BWPs of this serving cell. (see TS 38.212 [17], clause 5.4.2.1) for which maxMIMO-LayersBWP is not configured.
  maxMIMO-LayersB WP
    Indicates the maximum MIMO layer to be used for PDSCH in the BWP of this serving cell. (see TS 38.212 [17], clause 5.4.2.1). If absent, maxMIMO-Layers of the serving cell is applied Particularly, in operation 9-40, the UE may determine a transport block size (TBS) needed for transmission or reception based on the maximum number of MIMO layers for each uplink or downlink BWP determined in operation 9-35, the number of physical resource blocks (PRBs), a modulation order, and the like. That is, a data block size actually applied to transmission or reception may be determined.

Subsequently, in operation 9-45, the UE may perform data transmission or reception based on the value set in the above-described operations. In the case of uplink transmission, data transmission may be performed by applying the parameters determined in the above-described operations. In the case of downlink reception, monitoring and reception may be performed based on the set number of MIMO layers. According to the disclosure, the UE may perform transmission or reception using a smaller number of MIMO layers in a BWP, and may reduce the amount of power consumed.

Figure 10:
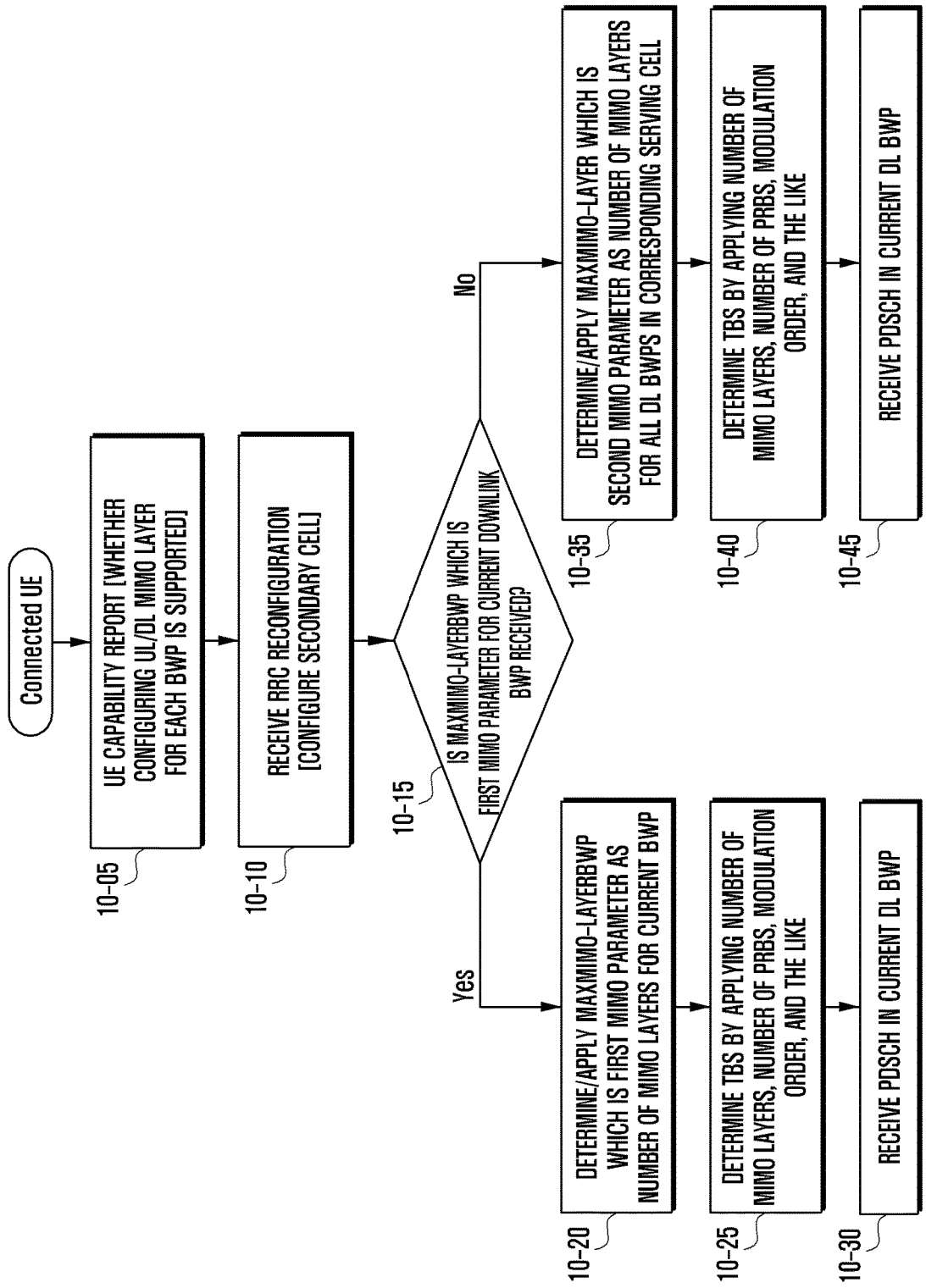
FIG. 10 is a diagram illustrating a method of setting the maximum number of MIMO layers for a predetermined downlink BWP by limiting the number than the cell-based maximum number of MIMO layers in embodiment 2 provided in the disclosure.

FIG. 10 is a diagram illustrating a method of setting the maximum number of MIMO layers for a downlink BWP by limiting the number than the cell-based maximum number of MIMO layers in embodiment 2 provided in the disclosure.

As described above, according to embodiment 2, the maximum number of MIMO layers for a BWP among the BWPs configured for a serving cell may be limited and set. From the perspective that all BWPs in the serving cell are capable of having different configurations (the maximum number of MIMO layers) from other BWPs, the configuration of the maximum number of MIMO layers for each BWP may be flexibly applied.

Referring to FIG. 10, a base station may transmit an RRC message (UECapabilityEnquiry) that requests UE capability to a RRC connected-state UE, and the UE may transfer a UE capability information (UECapabilityInformation) message to the base station in response thereto in operation 10-05. The UE capability information RRC message may include overall UE capability, such as a physical area capability, a protocol area capability, frequency band information, and the like supported by the UE. Particularly, the disclosure may additionally include information indicating whether the maximum number of MIMO layers is capable of being set for each BWP supported by a UE in a second NR system, in addition to the legacy UE capability in a first NR system. The UE capability may be signaled independently for each of an uplink and a downlink, or may be signaled to simultaneously indicate support for an uplink and a downlink. In addition, signaling may be performed according to one of the following methods.

A method of signaling whether to support for each UE (per UE)

A method of signaling whether to support for each band combination (per band combination)

A method of signaling whether to support for each band in a band combination (per band per band combination)

A method of signaling whether to support for each component carrier (CC) in a corresponding band in a band combination (per CC per band per band combination): including the corresponding information in FeatureSetDownlinkPerCC, FeatureSetUPlinkPerCC As the information indicating the UE capability, a 1-bit indicator indicating that the maximum number of MIMO layers indicated for each serving cell may have a different value in a predetermined BWP may be included, or the maximum number of MIMO layers supported by the UE for each BWP, which is different from the maximum number of MIMO layers indicated for each serving cell, may be indicated. In this instance, the corresponding signaling for an uplink and a downlink may be performed independently or in common. For reference, according to the current NR standard, the maximum number of MIMO layers for an uplink and a downlink in a serving cell may be provided for each component carrier (CC) in a corresponding band in a band combination, as shown below. In addition, in detail, in the case of codebook-based transmission, the maximum number of MIMO layers may be independently reported for an uplink (PUSCH). Accordingly, UE capability for the case in which it is different from the codebook-based PUSCH transmission may be additionally included, as opposed to UE capability for overall uplink transmission in a predetermined BWP.

The base station that receives the UE capability information in the above operation may identify whether the corresponding UE is capable of being configured with the maximum number of MIMO layers different for each BWP. If the corresponding base station supports a configuration of the maximum number of MIMO layers for uplink or downlink data transmission for each BWP, the base station may set configuration information for the same, may include the configuration information in an RRC reconfiguration message (RRCReconfiguration), and may transmit the same to the UE. In operation 10-10, the UE may receive the same. The RRC message may include configuration information associated with a secondary cells, and particularly, may include BWP configuration information for each serving cell, as follows.

configuration information for each uplink or downlink BWP (pdsch-config, pusch-config)
  BWP index
  BWP detailed configuration information: bandwidth information, a location in the frequency domain, PDSCH and PUSCH configuration information, and the like
  maxMIMO-LayersBWP (first maxMIMO parameter) information related to a single BWP per serving cell
  Default BWP index
  First Active BWP index
  Initial BWP configuration information (bandwidth information, a location in the frequency domain, or the like)
  Inactivity-BWP timer information (a timer for returning to a default BWP) common configuration information applied to a serving cell (signaling separately for an uplink and a downlink: pdsch-ServingCellConfig and pusch-ServingCellConfig)
  The maximum number of MIMO layers applied to the all BWPs of a serving cell (maxMIMO-Layer: second MIMO parameter)

In operations subsequent to operation 10-15, the UE may perform preparing of downlink data reception by applying the RRC message and parameters received in the above operations. Hereinafter, among operations in embodiment 2, configuring of the maximum number of MIMO layers for a UE for downlink data reception and preparing of actual reception of a physical data block will be described, and uplink UE operation will be described with reference to FIG. 11, separately. However, it is apparent that operations subsequent to operation 10-15 in the drawing and operations subsequent to operation 11-15 of FIG. 11 are simultaneously applied to the UE and are performed.

In operation 10-15, the UE may identify whether configuration information (first MIMO parameter: maxMIMO-LayerBWP) associated with the maximum number of MIMO layers applied to a downlink BWP is configured in the RRC control message received from the base station in operation 10-10. If the UE receives maxMIMO-LayerBWP parameter configuration information associated with a downlink BWP via the RRC message, and the UE operates in a corresponding downlink BWP according to the configuration information, the UE may set maxMIMO-LayerBWP which is a first MIMO parameter, for the corresponding BWP, and may apply the same in operation 10-20. In operation 10-25, the UE may determine a transport block size (TBS) needed for transmission or reception based on the determined maximum number of MIMO layers for each downlink BWP, the number of physical resource blocks (PRBs), a modulation order, and the like. That is, a data block size actually applied to transmission or reception may be determined. That is, the maximum number of MIMO layers in the corresponding uplink or downlink BWP may be set based on the set parameter in operation 10-25, and data transmission or reception may be prepared and performed in operation 10-30. Through the above, the maximum number of MIMO layers applied to the set downlink BWP may become smaller than a value set in advance for each cell. When the number of MIMO layers for data reception is decreased, the UE may reduce the number of reception MIMO layers needed for monitoring, and thus, may reduce the amount of power consumed for reception. Subsequently, in operation 10-30, the UE may perform monitoring and data reception based on the number of MIMO layers set in the above-described operations. A series of processes of performing data transmission or reception may not be different from the legacy NR system. However, according to the disclosure, the UE may perform transmission or reception using a smaller number of MIMO layers in a BWP, and may reduce the amount of power consumed.

If the UE does not receive maxMIMO-LayerBWP parameter configuration information associated with a downlink BWP via the RRC message in operation 10-15, the UE may set maxMIMO-Layer which is a second MIMO parameter for all downlink BWPs existing in the serving cell and may apply the same in operation 10-35. In operation 10-40, the UE may determine a transport block size (TB S) needed for transmission or reception based on the maximum number of MIMO layers for each downlink BWP determined in operation 10-35, the number of physical resource blocks (PRBs), a modulation order, and the like. That is, a data block size actually applied to transmission or reception may be determined. Subsequently, in operation 10-45, the UE may perform monitoring and data reception based on the number of MIMO layers set in the above-described operations. A series of processes of performing data transmission or reception may not be different from the legacy NR system. However, according to the disclosure, the UE may perform transmission or reception using a smaller number of MIMO layers in a BWP, and may reduce the amount of power consumed.

Figure 11:
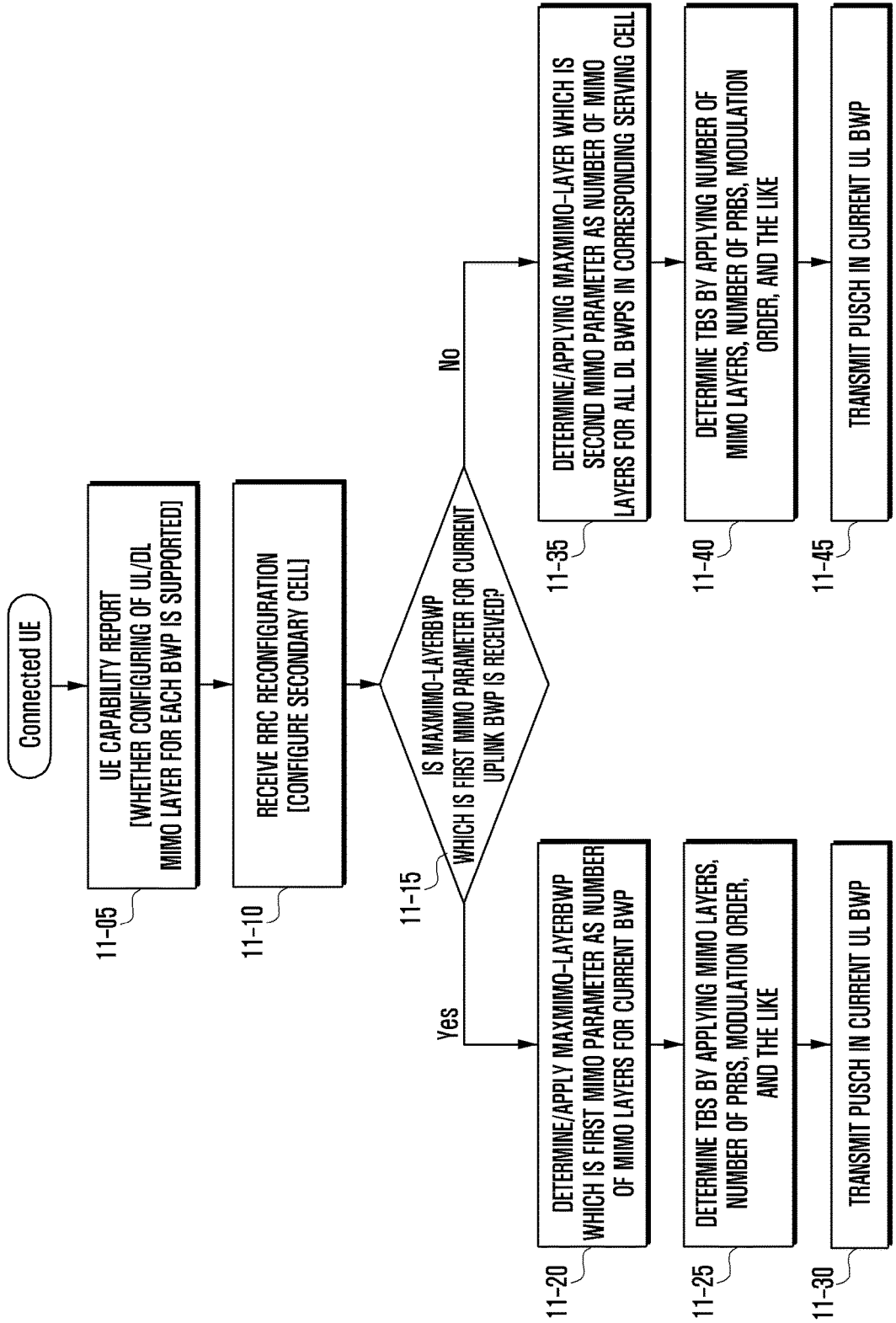
FIG. 11 is a diagram illustrating a method of setting the maximum number of MIMO layers for a predetermined uplink BWP by limiting the number than the cell-based maximum number of MIMO layers in embodiment 2 provided in the disclosure.

FIG. 11 is a diagram illustrating a method of setting the maximum number of MIMO layers for an uplink BWP by limiting the number than the cell-based maximum number of MIMO layers in embodiment 2 provided in the disclosure.

As described above, according to embodiment 2, the maximum number of MIMO layers for a BWP among the BWPs configured for a serving cell may be limited and set. From the perspective that all BWPs in the serving cell are capable of having different configurations (the maximum number of MIMO layers) from other BWPs, the configuration may be flexibly applied.

Referring to FIG. 11, a base station may transmit an RRC message (UECapabilityEnquiry) that requests UE capability to a RRC connected-state UE, and the UE may transfer a UE capability information (UECapabilityInformation) message to the base station in response thereto in operation 11-05. The UE capability information RRC message may include overall UE capability, such as a physical area capability, a protocol area capability, frequency band information, and the like supported by the UE. Particularly, the disclosure may additionally include information indicating whether the maximum number of MIMO layers is capable of being set for each BWP supported by a UE in a second NR system, in addition to the legacy UE capability in a first NR system.

The UE capability may be signaled independently for each of an uplink and a downlink, or may be signaled to simultaneously indicate support for an uplink and a downlink. In addition, signaling may be performed according to one of the following methods.

A method of signaling whether to support for each UE (per UE)

A method of signaling whether to support for each band combination (per band combination)

A method of signaling whether to support for each band in a band combination (per band per band combination)

A method of signaling whether to support for each component carrier (CC) in a corresponding band in a band combination (per CC per band per band combination): including the corresponding information in FeatureSet-DownlinkPerCC, FeatureSetUPlinkPerCC As the information indicating the UE capability, a 1-bit indicator indicating that the maximum number of MIMO layers indicated for each serving cell may have a different value in a predetermined BWP may be included, or the maximum number of MIMO layers supported by the UE for each BWP, which is different from the maximum number of MIMO layers indicated for each serving cell, may be indicated. In this instance, the corresponding signaling for an uplink and a downlink may be performed independently or in common. For reference, according to the current NR standard, the maximum number of MIMO layers for an uplink and a downlink in a serving cell may be provided for each component carrier (CC) in a corresponding band in a band combination, as shown below. In addition, in detail, in the case of codebook-based transmission, the maximum number of MIMO layers may be independently reported for an uplink (PUSCH). Accordingly, UE capability for the case in which it is different from the codebook-based PUSCH transmission may be additionally included, as opposed to UE capability for overall uplink transmission in a predetermined BWP.

The base station that receives the UE capability information in the above operation may identify whether the corresponding UE is capable of being configured with the maximum number of MIMO layers different for each BWP. If the corresponding base station supports a configuration of the maximum number of MIMO layers for uplink or downlink data transmission for each BWP, the base station may set configuration information for the same, may include the configuration information in an RRC reconfiguration message (RRCReconfiguration), and may transmit the same to the UE. In operation 11-10, the UE may receive the same. The RRC message may include configuration information associated with a secondary cells, and particularly, may include BWP configuration information for each serving cell, as follows.

configuration information for each uplink or downlink BWP (pdsch-config, pusch-config)
      BWP index
      BWP detailed configuration information: bandwidth information, a location in the frequency domain, PDSCH and PUSCH configuration information, and the like
      maxMIMO-LayersBWP (first maxMIMO parameter) information related to a single BWP per serving cell
      Default BWP index
      First Active BWP index
      Initial BWP configuration information (bandwidth information, a location in the frequency domain, or the like)
      Inactivity-BWP timer information (a timer for returning to a default BWP) common configuration information applied to a serving cell (signaling separately for an uplink and a downlink: pdsch-ServingCellConfig and pusch-ServingCellConfig)
      The maximum number of MIMO layers applied to the all BWPs of a serving cell (maxMIMO-Layer: second MIMO parameter)

In operations subsequent to operation 11-15, the UE may perform preparing of uplink data reception by applying the RRC message and parameters received in the above operation. Hereinafter, among operations in embodiment 2, configuring of the maximum number of MIMO layers for a UE for uplink data reception and preparing of actual transmission of a physical data block will be described, and downlink UE operation is described with reference to FIG. 10, separately. However, it is apparent that operations subsequent to operation 11-15 in the drawing and the operations subsequent to operation 10-15 of FIG. 10 are simultaneously applied to the UE and are performed.

In operation 11-15, the UE may identify whether configuration information (first MIMO parameter: maxMIMO-LayerBWP) associated with the maximum number of MIMO layers applied to an uplink BWP is configured in the RRC control message received from the base station in operation 11-10. If the UE receives maxMIMO-LayerBWP parameter configuration information via the RRC message, and the UE operates in a corresponding uplink BWP according to the corresponding configuration information, the UE may set maxMIMO-LayerBWP which is a first MIMO parameter, for the corresponding BWP, and may apply the same in operation 11-20. In operation 11-25, the UE may determine a transport block size (TBS) needed for transmission or reception based on the determined maximum number of MIMO layers for each uplink BWP, the number of physical resource blocks (PRBs), a modulation order, and the like. That is, a data block size actually applied to transmission or reception may be determined. That is, the maximum number of MIMO layers in the corresponding uplink BWP may be set based on the set parameter in operation 11-25, and data transmission or reception may be prepared and performed in operation 11-30. Through the above, the maximum number of MIMO layers applied to the set uplink BWP may become smaller than a value set in advance for each cell. When the number of MIMO layers for data reception is decreased, the UE may reduce the number of transmission MIMO layers needed for data transmission, and thus, may reduce the amount of power consumed for data transmission. Subsequently, in operation 11-30, the UE may perform data transmission based on the number of MIMO layers set in the above-described operations. A series of processes of performing data transmission or reception may not be different from the legacy NR system. However, according to the disclosure, the UE may perform transmission or reception using a smaller number of MIMO layers in a BWP, and may reduce the amount of power consumed.

If the UE does not receive maxMIMO-LayerBWP parameter configuration information associated with an uplink BWP via the RRC message in operation 11-15, the UE may set maxMIMO-Layer which is a second MIMO parameter, for all uplink BWPs existing in the serving cell and may apply the same in operation 11-35. In operation 11-40, the UE may determine a transport block size (TBS) needed for transmission or reception based on the maximum number of MIMO layers for each uplink BWP determined in operation 11-35, the number of physical resource blocks (PRBs), a modulation order, and the like. That is, a data block size actually applied to transmission or reception may be determined. Subsequently, in operation 11-45, the UE may perform data transmission based on the number of MIMO layers set in the above-described operations. A series of processes of performing data transmission or reception may not be different from the legacy NR system. However, according to the disclosure, the UE may perform transmission or reception using a smaller number of MIMO layers in a BWP, and may reduce the amount of power consumed.

Figure 12:
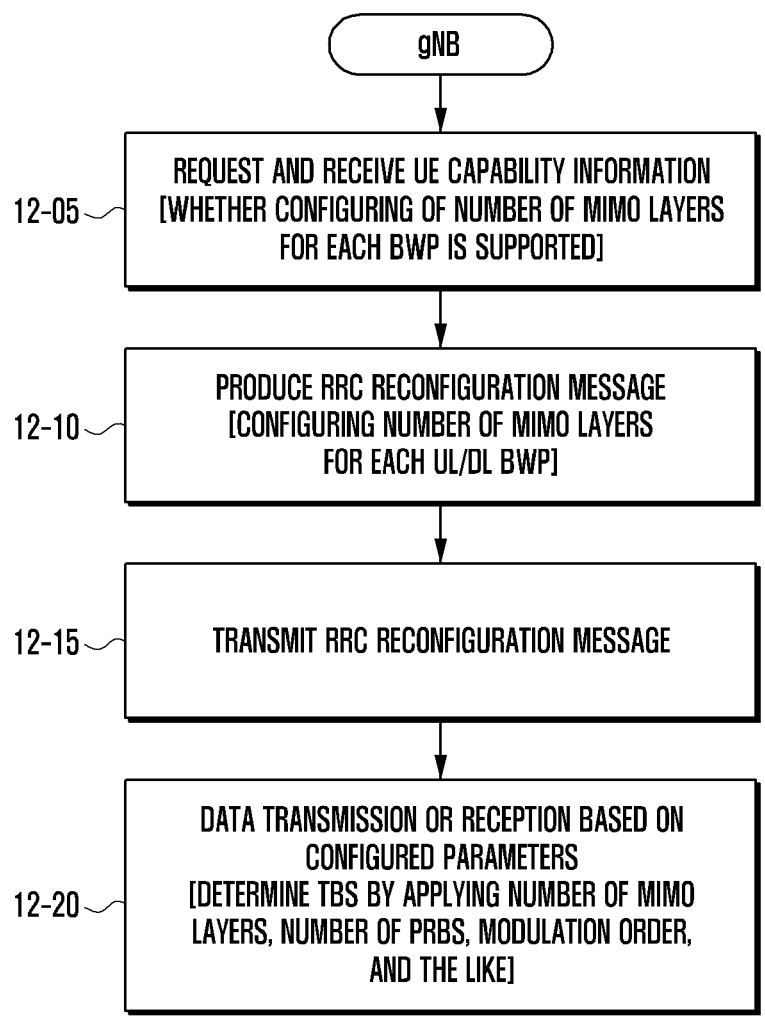
FIG. 12 is a diagram illustrating operation of a base station applied to the all embodiments provided in the disclosure.

FIG. 12 is a diagram illustrating operation of a gNB applied to the all embodiments provided in the disclosure.

In the drawing, the structure of operation of a gNB applied to the whole of embodiment 1 and embodiment 2 is described, and detailed description thereof has been provided with reference to FIGS. 6 to 9 for each embodiment.

In operation 12-05, the gNB may transmit an RRC message (UECapabilityEnquiry) that requests UE capability information to a connected-state UE, and may receive a UE capability information (UECapabilityInformation) message in response thereto. The UE capability information message may include UE capability information indicating whether the UE is capable of setting the maximum number of MIMO layers to be different for each predetermined uplink or downlink BWP. Based on the information, the gNB may determine whether the gNB is capable of setting the maximum number of MIMO layers to be different for each uplink or downlink BWP for the UE.

In operation 12-10, the gNB may configure a maxMIMO-Layers parameter for each uplink or downlink in order to set the number of MIMO layers applied to all BWPs existing in the serving cell, and may set, for a predetermined BWP, a value different from the maxMIMO-Layers that used to be applied to the entire serving cell. Regarding the configuration by the gNB in this operation, a detailed configuration method thereof in embodiment 1 and embodiment 2 may be different, which have been described in detail in embodiment 1 and embodiment 2. In operation 12-15, the gNB transmits, to the UE, an RRC reconfiguration message including the parameter information set in the above-described operation.

In operation 12-20, by applying the set parameter, the gNB may set parameters needed for uplink or downlink data transmission or reception, and may prepare data transmission and reception. That is, the UE may determine a transport block size (TBS) needed for transmission or reception based on the maximum number of MIMO layers for each uplink or downlink BWP, the number of physical resource blocks (PRBs), a modulation order, and the like, and a data block size actually applied to transmission or reception may be determined. Subsequently, data transmission may be performed based on the number of MIMO layers set in the above-described operations. A series of processes of performing data transmission or reception may not be different from the legacy NR system. However, according to the disclosure, the UE may perform transmission or reception using a smaller number of MIMO layers in a BWP, and may reduce the amount of power consumed.

Figure 13:
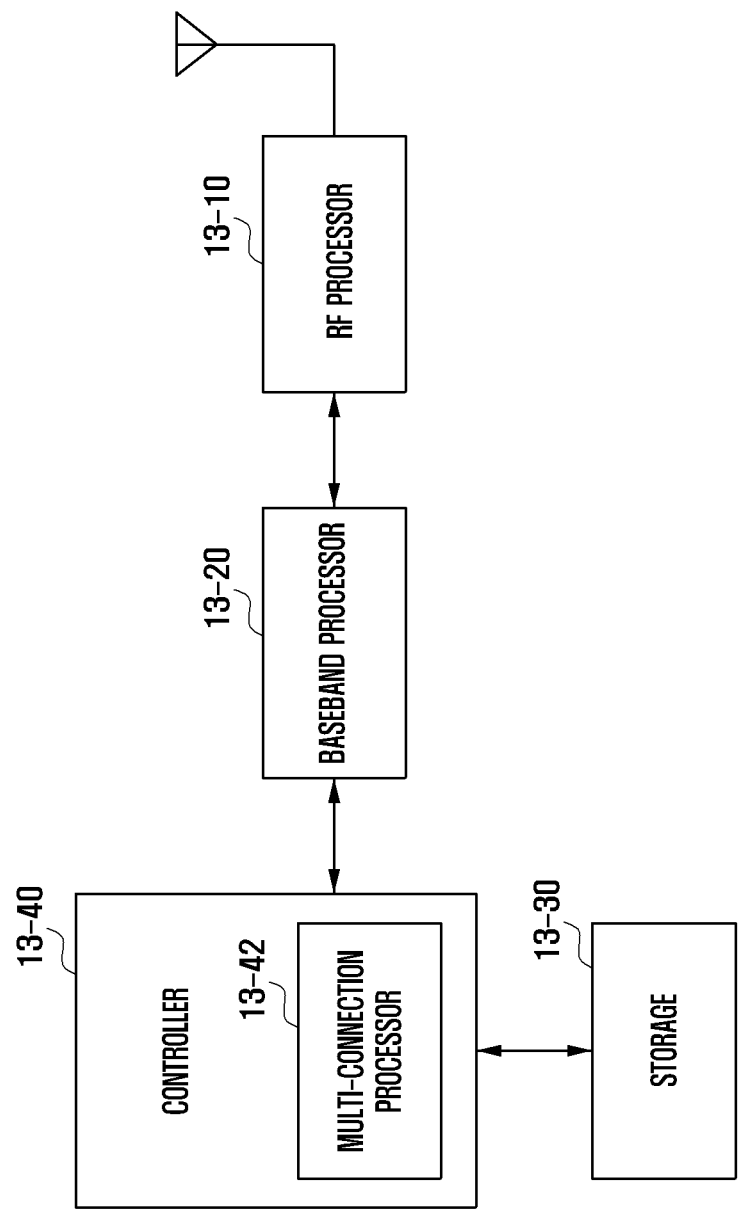
FIG. 13 is a block diagram illustrating the internal structure of a user equipment (UE) to which the disclosure is applied.

FIG. 13 is a block diagram illustrating the internal structure of a user equipment (UE) to which the disclosure is applied.

Referring to the drawing, the UE includes a radio frequency (RF) processor 13-10, a baseband processor 13-20, a storage 13-30, and a controller 13-40.

The RF processor 13-10 performs a function of transmitting or receiving a signal via a wireless channel, such as band conversion and amplification of a signal. That is, the RF processor 13-10 up-converts a baseband signal provided from the baseband processor 13-20 into an RF band signal so as to transmit the RF band signal via an antenna, and down-converts an RF band signal received via the antenna into a baseband signal. For example, the RF processor 13-10 may include a transmission filter, a reception filter, an amplifier, a mixer, an oscillator, a digital-to-analog converter (DAC), an analog-to-digital converter (ADC), and the like. Although only a single antenna is illustrated in the drawing, the UE may include a plurality of antennas. In addition, the RF processor 13-10 may include a plurality of RF chains. Moreover, the RF processor 13-10 may perform beamforming. For the beamforming, the RF processor 13-10 may control the phase and the size of each of the signals transmitted or received via a plurality of antennas or antenna elements. In addition, the RF processor may perform MIMO, and may receive multiple layers when performing a MIMO operation.

The baseband processor 13-20 executes a function of converting between a baseband signal and a bitstream according to the physical layer standard of a system. For example, in the case of data transmission, the baseband processor 13-20 encodes and modulates a transmission bitstream, so as to produce complex symbols. In addition, in the case of data reception, the baseband processor 13-20, restores a reception bitstream by demodulating and decoding a baseband signal provided from the RF processor 13-10. For example, according to an orthogonal frequency division multiplexing (OFDM) scheme, in the case of data transmission, the baseband processor 13-20 produces complex symbols by encoding and modulating a transmission bitstream, maps the complex symbols to subcarriers, and then configures OFDM symbols via an inverse fast Fourier transform (IFFT) operation and cyclic prefix (CP) insertion. Further, in the case of data reception, the baseband processor 13-20 divides the baseband signal provided from the RF processor 13-10 in units of OFDM symbols, reconstructs the signals mapped to the subcarriers via a fast Fourier transform (FFT) operation, and then reconstructs a received bitstream via demodulation and decoding.

The baseband processor 13-20 and the RF processor 13-10 transmit and receive signals as described above. Accordingly, the baseband processor 13-20 and the RF processor 13-10 may be referred to as a transmitter, a receiver, a transceiver, or a communication unit. Furthermore, at least one of the baseband processor 13-20 and the RF processor 13-10 may include a plurality of communication modules in order to support different multiple radio access technologies. In addition, at least one of the baseband processor 13-20 and the RF processor 13-10 may include different communication modules to process signals of different frequency bands. For example, the different radio access technologies may include a wireless LAN (e.g., IEEE 802.11), a cellular network (e.g., LTE), and the like. In addition, the different frequency bands may include a super high frequency (SHF) (e.g., 2.NRHz, NRhz) band and a millimeter (mm) wave (e.g., 60 GHz) band.

The storage 13-30 may store data such as a basic program, an application program, and configuration information for the operation of the UE. Particularly, the storage 13-30 may store information related to a second access node that performs wireless communication using a second radio access technology. In addition, the storage 13-30 may provide data stored therein according to a request of the controller 13-40.

The controller 13-40 may control overall operation of the UE. For example, the controller 13-40 may perform transmission or reception of a signal via the baseband processor 13-20 and the RF processor 13-10. In addition, the controller 13-40 may record data in the storage 13-40 and read the data.

To this end, the controller 13-40 may include at least one processor. For example, the controller 13-40 may include a communication processor (CP) that performs control for communication, and an application processor (AP) that controls an upper layer such as an application program.

Figure 14:
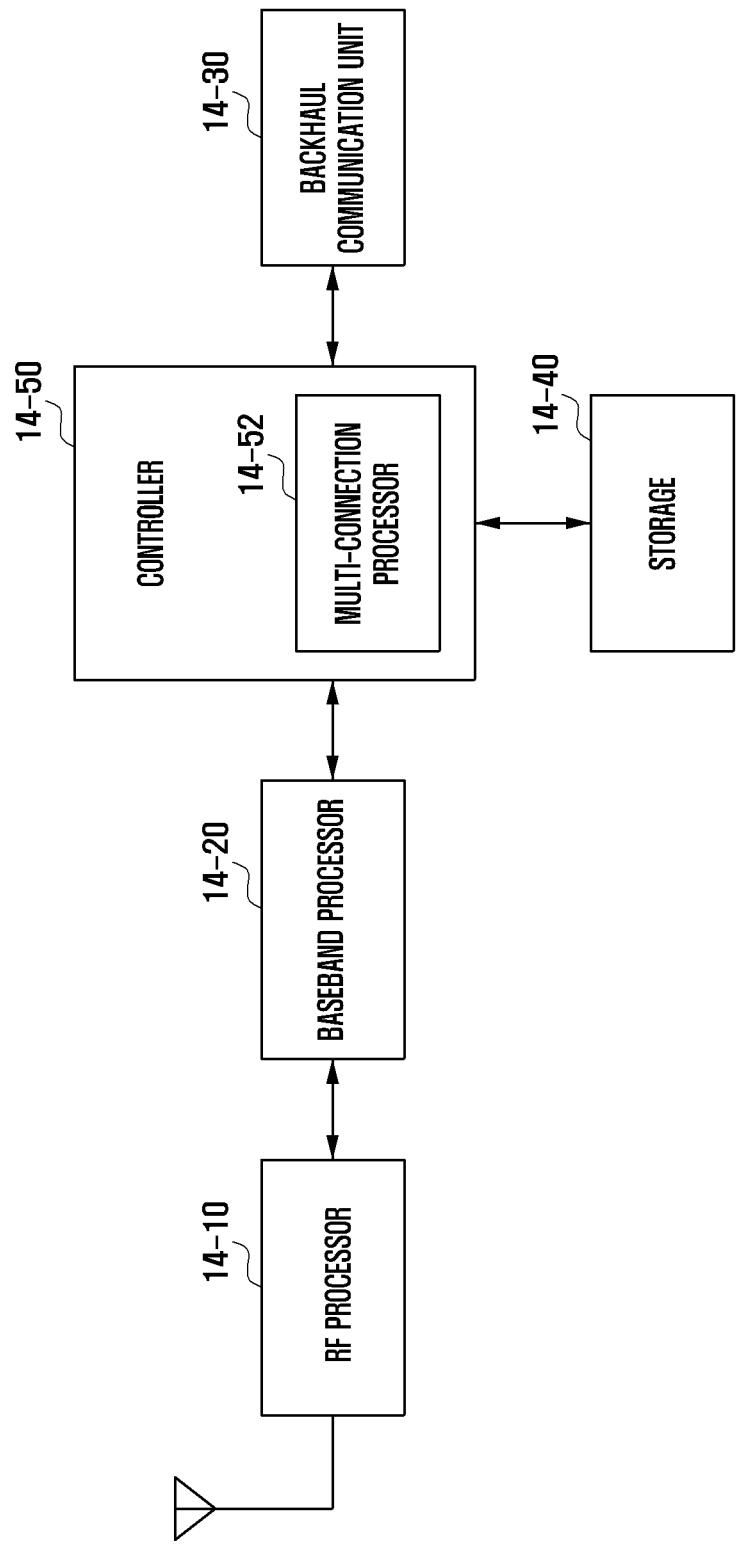
FIG. 14 is a block diagram illustrating the configuration of a base station according to embodiments.

FIG. 14 is a block diagram illustrating the configuration of a base station according to embodiments.

As illustrated in the drawing, the base station may include an RF processor 14-10, a baseband processor 14-20, a backhaul communication unit 14-30, a storage unit 14-40, and a controller 14-50.

The RF processor 14-10 performs a function of transmitting or receiving a signal via a wireless channel, such as band conversion and amplification of a signal. That is, the RF processor 14-10 up-converts a baseband signal provided from the baseband processor 14-20 into an RF band signal so as to transmit the RF band signal via an antenna, and down-converts an RF band signal received via the antenna into a baseband signal. For example, the RF processor 14-10 may include a transmission filter, a reception filter, an amplifier, a mixer, an oscillator, a DAC, an ADC, and the like. Although only a single antenna is illustrated in the drawing, the first access node may include a plurality of antennas. In addition, the RF processor 14-10 may include a plurality of RF chains. Moreover, the RF processor 14-10 may perform beamforming. For the beamforming, the RF processor 14-10 may control the phase and the size of each of the signals transmitted or received via a plurality of antennas or antenna elements. The RF processor may perform a downlink MIMO operation by transmitting one or more layers.

The baseband processor 14-20 performs a function for conversion between a baseband signal and a bitstream according to the physical layer standard of a first radio access technology. For example, in the case of data transmission, the baseband processor 14-20 encodes and modulates a transmission bitstream, so as to produce complex symbols. In addition, in the case of data reception, the baseband processor 14-20 restores a reception bitstream by demodulating and decoding a baseband signal provided from the RF processor 14-10. For example, according to the OFDM scheme, in the case of data transmission, the baseband processor 14-20 may produce complex symbols by encoding and modulating a transmission bitstream, map the complex symbols to subcarriers, and then configure OFDM symbols via an IFFT operation and CP insertion. In addition, in the case of data reception, the baseband processor 14-20 divides a baseband signal provided from the RF processor 14-10 in units of OFDM symbols, restores signals mapped onto the subcarriers via the FFT operation, and restores a received bit stream via demodulation and decoding. The baseband processor 14-20 and the RF processor 14-10 transmit and receive signals as described above. Accordingly, the baseband processor 14-20 and the RF processor 14-10 may be referred to as a transmitter, a receiver, a transceiver, a communication unit, or a wireless communication unit.

The backhaul communication unit 14-30 may provide an interface for performing communication with other nodes in a network. That is, the backhaul communication unit 14-30 may convert, into a physical signal, a bit stream transmitted from the primary base station to another node, for example, a secondary base station, a core network, and the like, and may convert a physical signal received from the other node into a bit stream.

The storage 14-40 stores data such as a basic program, an application program, and configuration information for the operation of the primary base station. Particularly, the storage 14-40 may store information associated with a bearer allocated to a connected UE, a measurement result reported from a connected UE, and the like. In addition, the storage 14-40 may provide multiple accesses to a UE, or may store information which is a criterion for determining whether to suspend connection. In addition, the storage 14-40 may provide data stored therein according to a request of the controller 14-50.

The controller 14-50 may control the overall operation of the primary base station. For example, the controller 14-50 may transmit or receive a signal via the baseband processor 14-20 and the RF processor 14-10, or via the backhaul communication unit 14-30. In addition, the controller 14-50 may record data in the storage 14-40 and read the data. To this end, the controller 14-50 may include at least one processor.

The invention claimed is:

1. A method of a user equipment (UE) in a communication system, the method comprising:
   receiving a radio resource control (RRC) message including information associated with a first maximum number of multi-input-multi-output (MIMO) layers from a base station, wherein the information associated with the first maximum number of MIMO layers is set for each serving cell of the UE;
   identifying whether information associated with a second maximum number of MIMO layers related to a downlink bandwidth part (BWP) is configured based on the RRC message, wherein the information associated with the second maximum number of MIMO layers is set for each BWP configured for the UE;
   in case that the information associated with the second maximum number of MIMO layers related to the downlink bandwidth part is configured, using the second maximum number of MIMO layers for a physical downlink shared channel (PDSCH); and
   in case that the information associated with the second maximum number of MIMO layers related to the downlink bandwidth part is not configured, using the first maximum number of MIMO layers for the PDSCH.

2. The method of claim 1, wherein the second maximum number of MIMO layers is less than or equal to the first maximum number of MIMO layers.

3. The method of claim 1
   wherein the first maximum number of MIMO layers indicates a maximum number of MIMO layers to be used for the PDSCH in all BWPs of the serving cell.

4. A method of a base station in a communication system, the method comprising:
   transmitting a radio resource control (RRC) message including information associated with a first maximum number of multi-input-multi-output (MIMO) layers to a user equipment (UE), wherein the information associated with the first maximum number of MIMO layers is set for each serving cell of the UE;
   identifying whether information associated with a second maximum number of MIMO layers related to a downlink bandwidth part (BWP) is configured based on the RRC message, wherein the information associated with the second maximum number of MIMO layers is set for each BWP configured for the UE;
   in case that the information associated with the second maximum number of MIMO layers related to the downlink bandwidth part is configured, using the second maximum number of MIMO layers for a physical downlink shared channel (PDSCH); and in case that the information associated with the second maximum number of MIMO layers related to the downlink bandwidth part is not configured, using the first maximum number of MIMO layers for PDSCH.

5. The method of claim 2, wherein the second maximum number of MIMO layers is less than or equal to the first maximum number of MIMO layers.

6. The method of claim 4, wherein the first maximum number of MIMO layers indicates a maximum number of MIMO layers to be used for the PDSCH in all BWPs of the serving cell.

7. A user equipment (UE) of a communication system, the UE comprising:

a transceiver; and a controller configured to:

receive a radio resource control (RRC) message including information associated with a first maximum number of multi-input-multi-output (MIMO) layers from a base station, wherein the information associated with the first maximum number of MIMO layers is set for each serving cell of the UE, identify whether information associated with a second maximum number of MIMO layers related to a downlink bandwidth part (BWP) is configured based on the RRC message, wherein the information associated with the second maximum number of MIMO layers is set for each BWP configured for the UE, use the second maximum number of MIMO layers for a physical downlink shared channel (PDSCH) in case that the information associated with the second maximum number of MIMO layers related to the downlink bandwidth part is configured, and use the first maximum number of MIMO layers for the PDSCH in case that the information associated with the second maximum number of MIMO layers related to the downlink bandwidth part is not configured.

8. The UE of claim 7, wherein the second maximum number of MIMO layers is less than or equal to the first maximum number of MIMO layers.

9. A base station of a communication system, the base station comprising:

a transceiver; and a controller configured to:

transmit a radio resource control (RRC) message including information associated with a first maximum number of multi-input-multi-output (MIMO) layers to a user equipment (UE), wherein the information associated with the first maximum number of MIMO layers is set for each serving cell of the UE, identify whether information associated with a second maximum number of MIMO layers related to a downlink bandwidth part (BWP) is configured based on the RRC message, wherein the information associated with the second maximum number of MIMO layers is set for each BWP configured for the UE, use the second maximum number of MIMO layers for a physical downlink shared channel (PDSCH) in case that the information associated with the second maximum number of MIMO layers related to the downlink bandwidth part is configured, and use the first maximum number of MIMO layers for the PDSCH in case that the information associated with the second maximum number of MIMO layers related to the downlink bandwidth part is not configured.

10. The base station of claim 9, wherein the second maximum number of MIMO layers is less than or equal to the first maximum number of MIMO layers.

11. The UE of claim 7, wherein the first maximum number of MIMO layers indicates a maximum number of MIMO layers to be used for the PDSCH in all BWPs of the serving cell.

12. The base station of claim 9, wherein the first maximum number of MIMO layers indicates a maximum number of MIMO layers to be used for the PDSCH in all BWPs of the serving cell.

* * * * *